(12) United States Patent
Melzner et al.

(10) Patent No.: US 8,931,939 B2
(45) Date of Patent: Jan. 13, 2015

(54) LED LUMINAIRE, PARTICULARLY LED HEADLIGHT

(75) Inventors: Erwin Melzner, Frasdorf (DE); Michael Jonischkeit, Alxing (DE)

(73) Assignee: Arnold & Richter Cine Tecnik GmbH & Co. Betriebs KG, Munich (DE)

( * ) Notice: Subject to any disclaimer, the term of this patent is extended or adjusted under 35 U.S.C. 154(b) by 34 days.

(21) Appl. No.: 13/391,608

(22) PCT Filed: Aug. 20, 2010

(86) PCT No.: PCT/EP2010/062200
§ 371 (c)(1),
(2), (4) Date: Feb. 21, 2012

(87) PCT Pub. No.: WO2011/020920
PCT Pub. Date: Feb. 24, 2011

(65) Prior Publication Data
US 2012/0155102 A1 Jun. 21, 2012

(30) Foreign Application Priority Data
Aug. 20, 2009 (DE) ............. 20 2009 011 500 U

(51) Int. Cl.
*F21V 17/02* (2006.01)
*F21V 5/00* (2006.01)
(Continued)

(52) U.S. Cl.
CPC .......... *F21V 7/0008* (2013.01); *G02B 27/095* (2013.01); *F21Y 2101/02* (2013.01);
(Continued)

(58) Field of Classification Search
USPC ............... 362/510, 516, 520–524, 244–245, 362/298–303, 508, 512–515, 531, 269–274, 362/277, 280, 285–289, 545, 311.02, 268
See application file for complete search history.

(56) References Cited

U.S. PATENT DOCUMENTS 3,244,071 A * 4/1966 Gumpertz ............... 353/36
4,448,504 A * 5/1984 Altman .................. 353/36
(Continued)

FOREIGN PATENT DOCUMENTS

DE       100 63 134 A1    6/2002
DE   10 2005 044 237 A1   3/2007
(Continued)

OTHER PUBLICATIONS

German Search Report for application No. 20 2009 011 500.3, dated Oct. 15, 2010, 4 sheets.
(Continued)

*Primary Examiner* — Ismael Negron
*Assistant Examiner* — Erin Kryukova
(74) *Attorney, Agent, or Firm* — Christie, Parker & Hale, LLP

(57) ABSTRACT

LED luminaire, particularly LED headlight, comprising an active light source (2) composed of a plurality of LEDs (21-26) that have the same color or different colors and are arranged on a flat or curved surface (20, 200) or circuit board and an optical system comprising a collimation optics unit (3), the individual lenses of which are arranged in a small distance above the emission surfaces of the LEDs (21-26) and which collects and focuses the light (L1-L4) emitted by the LEDs and directed onto a surface, a mixing optical unit (4), which receives the light (K1, K2, E) that has been directed onto a surface and focussed and mixes it in terms of the color and/or brightness, and a field optics unit (5) which receives the light (M1, M2 or N1, N2) emitted by the mixing optics unit (4) and emits it with pre-determined light distribution (F1-F4) to the far field.

22 Claims, 26 Drawing Sheets

Figure 4:
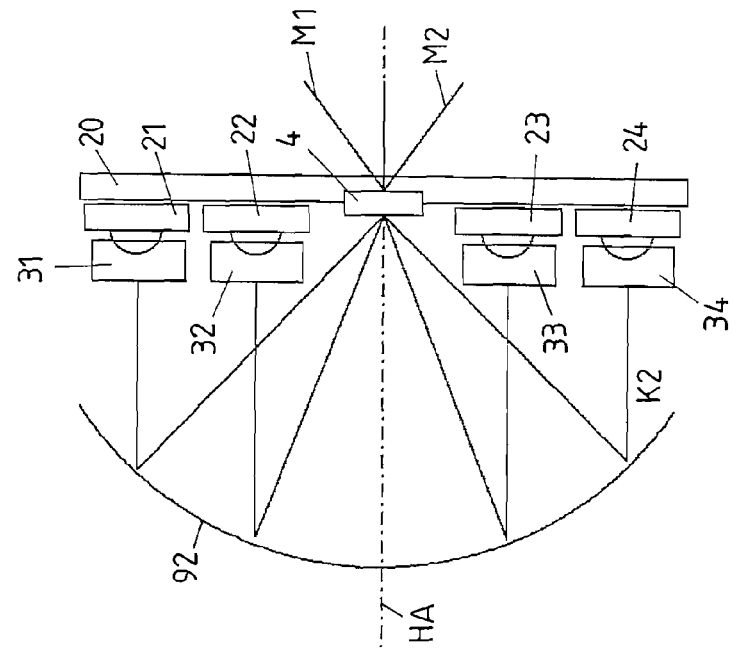

(51) Int. Cl.
*F21V 19/02* (2006.01)
*F21V 21/14* (2006.01)
*G02B 27/09* (2006.01)
*F21V 7/04* (2006.01)
*F21V 5/04* (2006.01)
*F21V 7/00* (2006.01)
*F21Y 101/02* (2006.01)
*F21V 21/30* (2006.01)
*F21W 131/406* (2006.01)
*F21Y 105/00* (2006.01)

(52) U.S. Cl.
CPC .............. *F21V 21/30* (2013.01); *F21V 7/041* (2013.01); *F21Y 2213/005* (2013.01); *F21V 5/04* (2013.01); *G02B 27/0905* (2013.01); *F21V 7/048* (2013.01); *F21W 2131/406* (2013.01); *F21Y 2105/003* (2013.01); *F21V 5/002* (2013.01)
USPC ........... 362/512; 362/521; 362/244; 362/245; 362/531

(56) References Cited

U.S. PATENT DOCUMENTS

| | | | | |
|---|---|---|---|---|
| 5,355,187 | A * | 10/1994 | Ogino et al. | 353/38 |
| 5,418,583 | A * | 5/1995 | Masumoto | 353/38 |
| 5,742,438 | A * | 4/1998 | Conner et al. | 359/743 |
| 5,997,150 | A * | 12/1999 | Anderson | 362/227 |
| 6,183,100 | B1 * | 2/2001 | Suckow et al. | 362/35 |
| 6,227,669 | B1 * | 5/2001 | Tiao et al. | 353/31 |
| 6,402,347 | B1 * | 6/2002 | Maas et al. | 362/294 |
| 6,443,594 | B1 * | 9/2002 | Marshall et al. | 362/244 |
| 6,478,453 | B2 * | 11/2002 | Lammers et al. | 362/294 |
| 6,547,423 | B2 * | 4/2003 | Marshall et al. | 362/333 |
| 6,575,598 | B2 * | 6/2003 | Weigert et al. | 362/268 |
| 6,834,982 | B2 * | 12/2004 | Dedoro | 362/268 |
| 6,866,401 | B2 * | 3/2005 | Sommers et al. | 362/268 |
| 6,899,451 | B2 | 5/2005 | Kittelmann et al. | |
| 6,939,009 | B2 * | 9/2005 | Fischer et al. | 353/43 |
| 7,048,385 | B2 * | 5/2006 | Beeson et al. | 353/97 |
| 7,150,552 | B2 * | 12/2006 | Weidel | 362/545 |
| 7,270,454 | B2 * | 9/2007 | Amano | 362/522 |
| 7,695,164 | B2 | 4/2010 | Berben et al. | |
| 2002/0181231 | A1 * | 12/2002 | Luk | 362/240 |
| 2006/0056185 | A1 * | 3/2006 | Morino et al. | 362/332 |
| 2007/0146639 | A1 * | 6/2007 | Conner | 353/20 |
| 2007/0147041 | A1 | 6/2007 | Shiratsuchi et al. | |
| 2007/0268696 | A1 | 11/2007 | Scordino | |
| 2007/0274068 | A1 * | 11/2007 | Berben et al. | 362/231 |
| 2008/0225528 | A1 * | 9/2008 | Holder et al. | 362/308 |
| 2008/0266893 | A1 * | 10/2008 | Speier | 362/551 |
| 2009/0002994 | A1 * | 1/2009 | Yoneda et al. | 362/294 |
| 2010/0219758 | A1 | 9/2010 | Melzner et al. | |
| 2010/0226142 | A1 | 9/2010 | Brendle et al. | |
| 2013/0194809 | A1 * | 8/2013 | Richardson et al. | 362/298 |

FOREIGN PATENT DOCUMENTS

| | | |
|---|---|---|
| DE | 10 2007 022 606 A1 | 11/2007 |
| DE | 10 2007 015 475 A1 | 5/2008 |
| DE | 10 2009 008 631 A1 | 8/2010 |
| EP | 1 241 399 B1 | 9/2002 |
| EP | 1 857 729 A1 | 11/2007 |
| EP | 1 890 076 A1 | 2/2008 |
| JP | 2004-214144 A | 7/2004 |
| JP | 2007-59220 A | 3/2007 |
| WO | WO 00/36336 | 6/2000 |
| WO | WO 2006/129570 A1 | 12/2006 |
| WO | WO 2007/069181 A1 | 6/2007 |
| WO | WO 2008086890 A1 * | 7/2008 |
| WO | WO 2009/033922 A2 | 3/2009 |

OTHER PUBLICATIONS

English translation of International Preliminary Report on Patentability for International application No. PCT/EP2010/062200, dated Apr. 12, 2012, 7 sheets.
English translation of Japanese Office action for Application No. JP 2012-525180, dated Feb. 25, 2014, 2 pages.

* cited by examiner

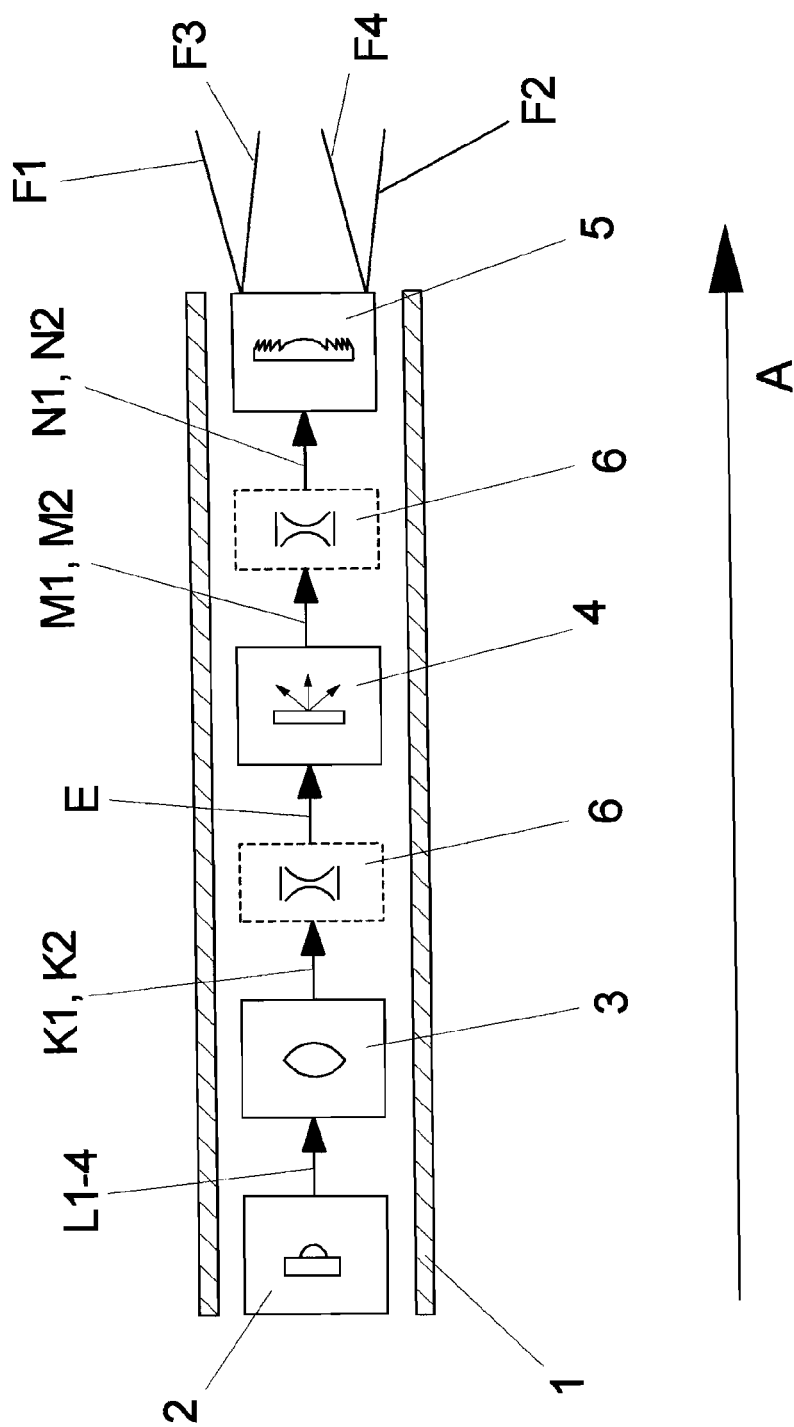

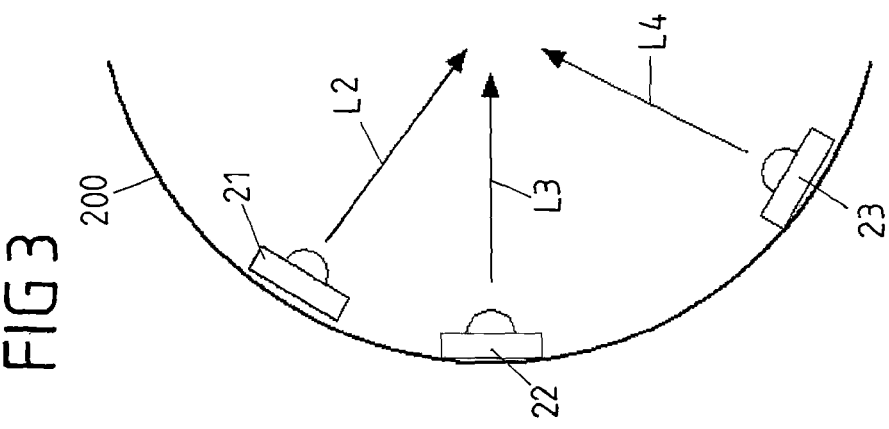
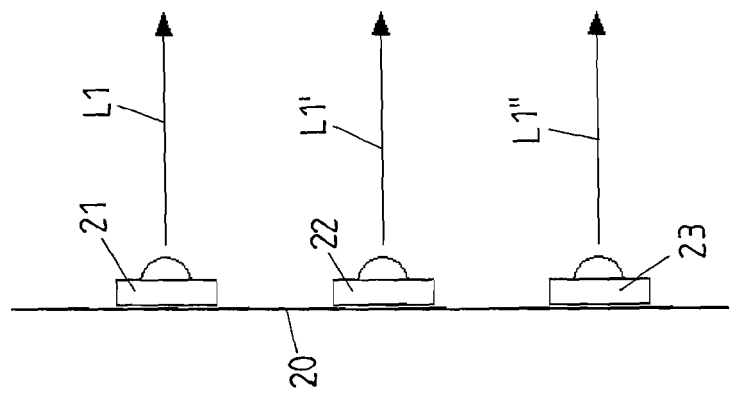

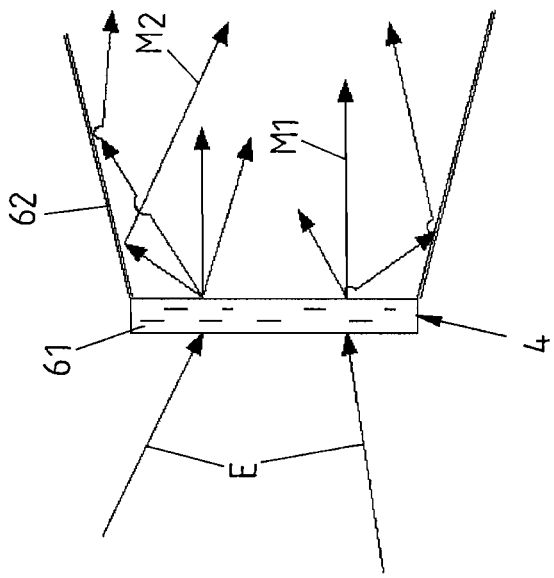
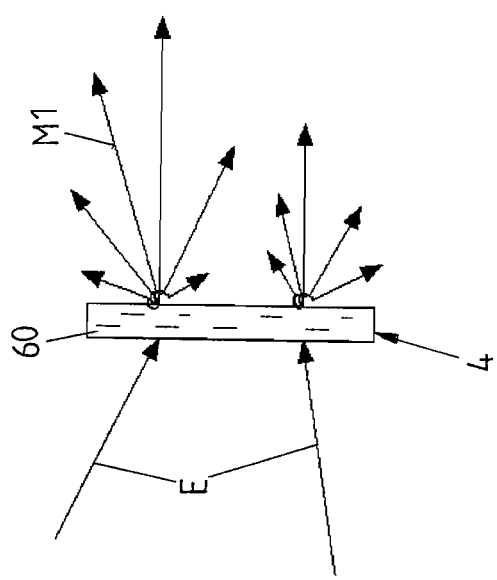

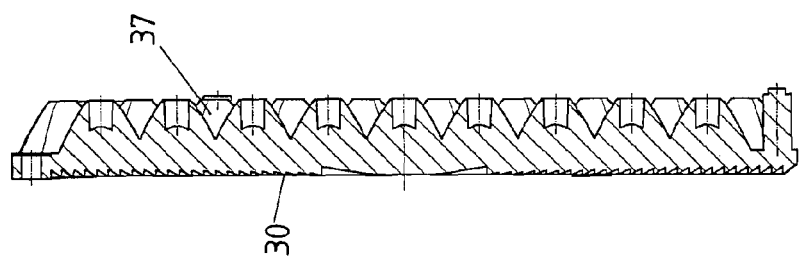
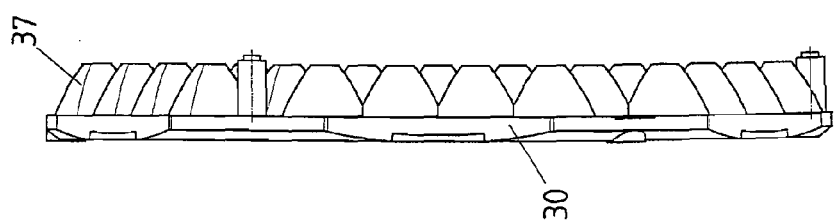
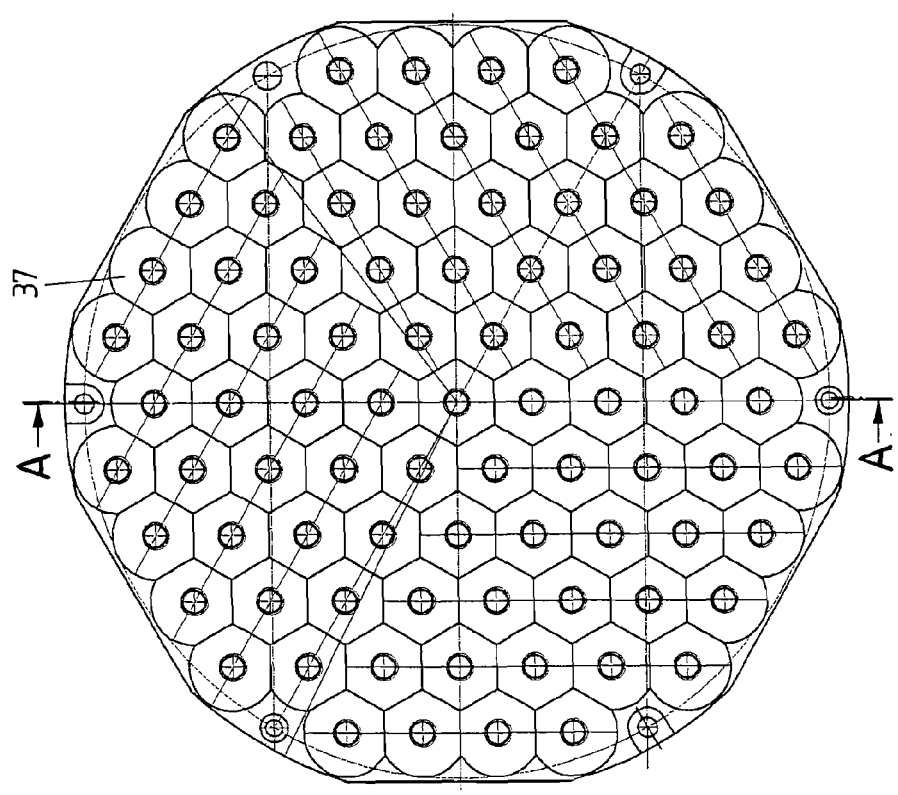

LED LUMINAIRE, PARTICULARLY LED HEADLIGHT

CROSS-REFERENCE TO RELATED APPLICATION

This application is a National Phase Patent Application and claims priority to and the benefit of International Application Number PCT/EP2010/062200, filed on Aug. 20, 2010, which claims priority of German Patent Application Number 20 2009 011 500.3, filed on Aug. 20, 2009.

The invention relates to an LED luminaire, in particular an LED headlight according to the preamble of claim 1.

Headlights are known from the DE 100 63 134 A1, which comprises a curved reflector, a lamp arranged within the hollow space of the curved reflector, a converting lens arranged in emission direction in front of the reflector and a diverging lens arranged between the reflector and the converging lens for obtaining a high light efficiency and an even light distribution. In order to focus the light emitted from the headlight, the reflector with the lamp or the diverging lens is movable in direction of the optical main axis of the headlight.

An optical system for a Fresnel lens headlight is known from EP 1 241 399 B1, which comprises an elliptic reflector, a lamp and at least one Fresnel lens for an improved light efficiency in a spot position as well as in a flood position of the light distribution by retaining the evenness of the illumination in the light field, the surface thereof or the surface reflecting the light of the reflector is structured. Depending on the opening angle of the light bundle exiting the headlight to be adjusted the distance of the lamp and the Fresnel lens to the reflector is adjustable permanently coupled.

An LED headlight with a light generating unit or "light engine" of multiple luminaire diodes or LEDs is known from PCT/EP 2008/060892, which is arranged on a board, which conducts the heat well heat and is connected to a cooling body. A light shaping device is coupled to the light generating unit, which contains an optic with a lens or a lens system for light mixing and/or beam shaping of the light beams emitted by the light generating device and is adjustable for focussing the light beams or for changing the semi-scattering angle in direction of the optical axis of the LED headlight. The light shaping device can be connected to a headlight accessory for changing the emitting angle and/or for generating special light effects, which consists of lens plates being adjustable against each other, a leaf barn door, a grid or diffuser or of scrims, gobos, holographic scattering films or such.

The object of the present invention is to provide an LED luminaire with a light source consisting of multiple luminaire diodes (LEDs), which allows for a wide adjustment range of the semi-scattering angle, guarantees a homogenous, weak fading out light field and provides in the flood setting a hard light source as well as in the spot setting a soft light source.

This object is solved according to the invention by a LED luminaire with a light source consisting of multiple luminaire diodes (LEDs) according the characterizing feature of claim 1.

The solution according to the invention provides an LED luminaire with a light source consisting of multiple LEDs which allows for a wide adjustment range of the semi-scattering angle, guarantees a homogenous, soft fading out light area and provides in the flood setting a hard light source, since here the light source is close to the field optic and generates on the field optic only one small light spot, while it provides in the spot setting a soft light source, since in this setting the light source is far removed from the field optic, such that the light fills out the diameter of the field optic.

Due to the arrangement of a collimation optics, which collects the light emitted by the LEDs of the active light source and directs it to a surface and pools it, the subordinated mixing optics is illuminated over the complete light entry surface and can optimally mix the bundled light directed to a surface, striking from different directions and can emit it with the same angle to a field optics, which receives the light emitted from the mixing optics and emits it into a far away field with pre-determined light distribution.

In order to account for the reflection of the optical elements subordinated to the active light source, which is dependent on the wave lengths, the LEDs emitting short wave light are predominantly arranged in the central area and the LEDs emitting long wave light are predominantly arranged in the outer area of an LED board, since long wave light is reflected stronger than short wave light.

The further advantage of the relatively wide distributed arrangement of the LEDs is that it provides space for the collimation lenses, which appear to be more effective and stronger focussed the larger the available space around the LED is.

The number and the type of the LEDs emitting coloured light on the LED board are preferably adjusted to a pre-determined colour temperature, in particular to a colour temperature of 2800° K to 6500° K.

Alternatively, the number and the type of the LEDs emitting the coloured light on the LED board can be adjusted to a variable colour temperature, in particular to an adjustable colour temperature range of 2800° K to 6500° K.

At least a part of the light emitted by the LEDs is directed through a colour filter, such that the spectrum of the light emitted by the headlight is being changed in a pre-determined manner.

By combining the spectrum emitting characteristics of the LEDs and the spectral transmission of the colour filter, in particular a colour sheet, the light emitted by the headlight is optimized in colour such that a desired colour location and/or a desired colour reproduction is achieved at maximum brightness.

In a preferred embodiment, the colour sheet is structured or punched for obtaining a certain transmission characteristic.

Due to the complete or partial filtration of the light emitted by the LEDs, white LEDs with poor colour reproduction but high efficiency can be used. The spectrum emitted by the LEDs is moved with the aid of the colour filter so far that the colour reproduction is optimized. The efficiency can then still be higher like when suitable LEDs would have been used. The colour location and the colour temperature can also be moved with the aid of a colour filter, in particular a colour filter sheet.

In order to discharge the heat produced during the light generation, the LED board is connected to a cooling body or to a cooling device with a movable cooling medium, in particular to a fan for cooling the LEDs.

Due to the arrangement of the LEDs in an area, which is large in comparison to the dimensions of the LEDs, only a reduced power density is obtained. The dissipation of the lost heat is therefore easily possible using this construction principle and can be achieved also with simple, passive cooling bodies up to performances of several hundred Watts. In contrast, when having a luminaire area with large power density, a dissipation of the heat is required mostly using heat pipes in connection with fans.

The collimation optics preferably reshapes the light beams emitted by the LEDs into a parallel or slightly convergent beam path, which fills the light entry surface of the mixing optics essentially completely with light.

The primary or active light source consists of multiple LEDs having the same or different colours, which are optionally already provided with a primary optics, in particular if these have already been installed by the manufacturer.

The LEDs of the active light source can be arranged alternatively on a plane surface or on the inside of a curved surface. When arranging the LEDs on a plane surface, for instance a plane panel, a metal core board, an epoxy resin board or a ceramic board, the LEDs emit the light in the same initial direction, whereat the collimation optics consists of multiple discreet optical elements with different initial direction, which focus the light emitted by the LEDs in a point or in a plane.

The advantage of such an arrangement of the LEDs on a plane surface is that the LEDs can be loaded by machine and optionally with other components onto the plane panel, metal core board, epoxy resin board or ceramic board and can be electrically contacted. The disadvantage is that each optical element of the collimation optics is designed differently, since each LED emits light in a different angle in respect to the subordinated mixing optics.

In the alternative arrangement of the LEDs of the active light source on the inside of a curved surface, for instance a tall pipe or half ball, a hollow parable or an aspheric hollow surface, the LEDs emit light towards the centre of curvature or focus of the curved surface, such that the same collimation optics can be provided for multiple or all LEDs of the active light source.

The advantage of this arrangement is that similar collimation optics can be used for multiple or all LEDs, since the LEDs already have the desired emission direction. The disadvantage is a more complicated assembly and a more complicated electrical connection of the LEDs since they are located on a curved surface and depending on the height of the LEDs and the collimation optics, a larger distance of the LEDs towards each other is required.

The collimation optics is a lens system that is connected to the LEDs in emission direction of the light emitted by the LEDs and which collimates or focuses the light in a spot or in a plane. A colour mixing is already being carried due to the superimposition of the light of the singe LEDs. Collimating of focussing lenses or lens systems, preferably made of optical plastics, can be used as collimation optics, which capture a light proportion of the radiation emitted by the LEDs and emitted in emission direction of a LED luminaire with a desired light distribution. TIR-lenses (Total Internal Reflection) are preferably used for optimizing the efficiency.

When arranging the LEDs of the active light source on a plane surface, the collimation optics consists of optical elements with different emission direction or of an optic board, into which optical surfaces with different emission directions are incorporated.

When arranging the LEDs of the active light source on a curved surface similar, discreet optical elements are used in contrast as collimation optics, which can be set above the LEDs. These optical elements can also be incorporated into a common optical component group.

The mixing optics consists of one or multiple optical elements, which mix the light emitted by the collimation optics in colour. The exit side of the mixing optics works thereby as a secondary or passive light source.

The mixing optics emits the light striking from different directions with about the same angle and comprises at least one optical element, which mixes the light emitted by the collimation optics in emission direction and is thus effective on the light exit side as a secondary light source.

Possible embodiments of the mixing optics are
a diffusion disc or a diffusion body with more or less strong scattering, for instance in form of a milk glass pane, a diffuse plastic pane or a diffuse half ball of plastic. The advantage of this embodiment consists in an optimal colour mixing at high scattering, the disadvantage is a small transmission and thus a small efficiency at high scattering;
optionally also complete permeable diffuser with a structure on the entry side and/or the exit side, for instance in form of honeycombs, prisms, micro lenses and such;
a so called holographic diffuser, which is obtained by moulding from a master hologram and which comprises a defined scattering in connection with a higher efficiency than a conventional, absorbing diffuser;
a diffuser with an intensifier on the light exit side which consists of a cone, which is mirrored on the inside and has thus an improved efficiency;
a honeycomb condenser, having the advantage of the high transmission and the disadvantage that a certain arrival and departure angle of the light cannot be exceeded and therefore a large overall length of the optical system or the headlight is required;
a light-mixing stick or taper having the advantage of the high transmission and the disadvantage of the large overall depth and decreasing transmission at good colour mixing.

The field optics being preferably designed as a field lens comprises a beam widening structure on the light entry side and a focussing structure, in particular a Fresnel structure on the light exit side.

The field optics can be designed as a singular converging lens, which displays the exit surface of the mixing surface or secondary or passive light source in the far field and has different distances to the mixing optics for achieving a variable emitting angle, or is designed as a lens system with predominantly displaying properties, which displays the exit surface of the mixing optics or the plane being in front thereof exactly into a far away located plane.

A convex lens, plane convex lens, aspheric converging lens, Fresnel lens or Fresnel lens with incorporated scattering structure (NOFS lens) can be used as converging lens. The entry and exit side of the converging lens can be provided with a structure, for instance a honeycomb, prism, micro lens or regular or irregular diffuser structure, or also with a holographic scattering structure for obtaining an improved colour mixture and/or for obtaining a soft continuation of the light field.

A zoom optics or a projection optics can be used as lens systems with predominantly displaying properties.

In order to achieve that the light emitted by the active light source arrives at the mixing optics in the desired manner, further optical elements, such as lenses or reflectors can be arranged if required between the active light source and the mixing optics, which deflect or reshape the light emitted by the active light source in an appropriate manner. Examples for such optical elements are plane or curved mirrors, converging lenses, fibre optics or light-mixing sticks.

In an embodiment, which is particularly space saving, the LEDs and the collimation optics are arranged on a board, which is in the plane of the mixing optics wherein the LEDs emit in the opposing direction to the mixing optics. The board itself comprises in its centre an opening for the mixing optics such that the LEDs are arranged circular-like around the mixing optics. A plane mirror with about half of the diameter of the LED board is in the emitting direction of the LEDs and reflects the light back to the mixing optics. In this manner only half of the construction distance is needed between the LEDs and the mixing optics.

In a further embodiment a mirror, which is concavely curved to conical and preferably facetted, is arranged at a position of the mirror mentioned above wherein said mirror also emits the light of the LEDs back to the mixing optics. The particular advantage of this arrangement is that all collimation optics of the singular LEDs emit the light straight backwards and can thus be then again designed identically.

In a combination of the two previously mentioned embodiments, collimation optics deflecting in an angle as well as linear emitting collimation optics can be used, the beams thereof are mirrored back to the mixing optics due to plane or curved mirror surfaces. This is of an advantage, if on the one hand a large number of different collimation objects have to be avoided and if on the other hand the certain entry angle at the mixing optic should not be exceeded.

In a further embodiment the mirroring element consists of a convex curved to conical, preferably facetted reflector and the LEDs are arranged with the collimation optics in one or multiple rings around the optical axis of the headlight. This arrangement also allows the application of one sort of similar collimation optics per ring and an optimal heat dissipation from the LEDs, which can then be coupled to the outside of the LED luminaire. The disadvantage of this arrangement is again that the LEDs have to be assembled in a complicated manner and have to be electrically contacted.

In order to avoid this, a polygonal outer cover can be used, wherein then collimation optics has to be used, which deflect the light in up to two different directions.

The circular or polygonal arrangement of the LEDs and the collimation optics can be completed by further LEDs and collimation optics for obtaining a higher power density, which is on the level of the mixing optics and which emits backwards. In this case a plane reflector is required when using deflecting collimation optics and a concave reflector is required when using linear emitting collimation optics. Further mixtures of different oriented LEDs, collimation optics deflecting light differently and differently positioned and curved mirror surfaces are conceivable. In the same manner, further optical elements, as previously indicated, can be arranged between the mixing optics and the field optics, which deflect or reshape the light emitted by the mixing optics or passive light source at the light exit sight of the mixing optics, in order to obtain a desired light distribution in the far field.

The active light source, the collimation optics and the mixing optics can be combined to one light generating unit, in particular for an LED headlight. The light generating unit contains a truncated cone-shaped reflector, the mantle surface thereof is mirrored inside, the open base area thereof is adjacent to the collimation optics and the open deck area thereof is adjacent to the mixing optics such that the light emitted by the LEDs and collected by the collimation optics is not only directed to the mixing optics, but also appearing scattered light is reflected into the beam path from the collimation optics to the mixing optics, and thus the efficiency is increased. The open base area of the truncated cone-shaped reflector merges into a reflector section enclosing the collimation optics, which is hollow cylindrically and mirrored on the inside, with which the light percentage emitted to the outside by the LEDs is mirrored back to the collimation optics.

In case of such a light generating unit the mixing optics is preferably arranged in the opening of a ring flange, the outer diameter thereof is equal to the outer diameter of the LED board and/or a circular disc-like board, which is connected to the LED board, wherein the ring flange on the one hand and the LED board and/or the circular disc-like board on the other hand form the front faces of a hollow cylindrical cartridge, wherein the cylindrical mantle thereof is connected to the ring flange and the LED board and/or the circular disc-like board.

Thereby the cartridge receiving the light generating unit can be designed as a compact unit with a hermetically closed water-tight housing out of which only the power supply and control cable is led via an opening, wherein said cable is connected to the LEDs and the control electronics for the LEDs. Furthermore, the cartridge can be used in different LED headlights by inserting said cartridge into a lens barrel of the headlight housing and by connecting said cartridge tightly to said lens barrel or by arranging said cartridge in the lens barrel movably in longitudinal direction, what simplifies the production of an LED headlight or different headlight types.

The ring flange is connected to the control electronics board via a stud acting as a spacer for an optimal construction space utilisation wherein said board comprises on the inner side of the ring flange facing the reflector a control electronics for controlling and regulating the LEDs. The outer surface of the truncated cone-shaped reflector, of the cylindrical mantle of the cartridge and the inner side of the ring flange enclose a sufficiently large space for receiving the control electronics and the heat radiation dissipated by the components of the control electronics.

The collimation optics comprises on its light entry side a collimator facing the LED board with cone-shaped total reflection lenses directed towards the singular LEDs and comprises on its light exit side an elaborate lens structure according to the type of a Fresnel lens, wherein the collimation optics is connected to the LED board via a spacer, the length thereof being dimensioned such that the cone-shaped total reflection lenses end in optimal distance to the LEDs. Thereby the cone-shaped total reflection lenses collect the light emitted by the LEDs, which are arranged on the LED board, over a wide range with a maximum space angle.

The LED board comprises a number of LEDs and multiple, distributed arranged thermal sensors, which detect the temperature on the LED board in different temperature zones such that the control electronics reduces the power consumption of the LEDs when threshold values of the temperature are exceeded or the power supply to the LEDs can be interrupted, whereby it is secured that inadmissible high temperatures occur at any point on the LED board.

The measurement of the temperatures serves furthermore as entry signal for the control electronics, which can regulate therewith the brightness and the colour of the emitted light to the intended value. In the same manner an optical sensor, which is introduced into the beam path as for instance a photo diode, a colour sensor or a mini spectrometer, can provide an entry signal for the control electronics for regulating the colour and brightness values.

A Fresnel lens, which is adjustable along the optical axis of the LED luminaire, is arranged In light emitting direction of the cartridge in front of the mixing optics, which receives the light emitted by the mixing optics and emits the light with a light distribution (flood, spot) adjustable by the distance of the Fresnel lens from the mixing optics into a far field.

The Fresnel lens comprises a structure on its light entry side which consists of spirally arranged, pentagonal optical elements.

Since in case of a plane light entry side of a Fresnel lens the local light distribution of the light exit side of the condenser of the mixing optics would be displayed in an angular distribution, wherein the colours emitted by the multi-coloured LEDs would not be absolutely homogenously distributed after the condenser due to its principle of action, such that colour effects would emerge, the specific structuring of the light entry side of the Fresnel lens removes despite of the light mixing properties of the mixing optics coloured effects beams still present such that the light mixed of different coloured LEDs can be displayed homogenously to the far field.

The cartridge and the Fresnel lens are arranged in the lens barrel of a luminaire or headlight housing for an easy setting and adjusting of the light distribution, wherein
- the Fresnel lens is adjustable in direction of the optical axis relative to the cartridge of a light generating unit being connected to the stationary lens barrel,
- the lens barrel is adjustable together with the Fresnel lens in direction of the optical axis relative to the stationary cartridge of the light generating unit or
- the cartridge of the light generating unit is adjustable along the optical axis relative to the stationary Fresnel lens connected to the lens barrel.

These different possibilities of setting and adjusting are provided, since the light generating unit is combined in a cartridge and can be arranged in the lens barrel of the luminaire or headlight housing.

An adjusting device, which can be actuated manually or electronically, for longitudinal adjustment of the cartridge in the luminaire or headlight housing, is preferably arranged between the cartridge and the luminaire or headlight housing.

The distance between the light generating unit and the optics of the light shaping device has to be changed for focussing an LED headlight or for changing the reflection angle of the light emitted by the LED headlight, which comprises in the flood position a large scattering angle and in the spot position a small scattering angle.

In order to achieve a reflecting characteristic of a Fresnel lens headlight, it is thus reasonable to move the optics close to the light exit opening of the light generating unit in order to achieve in the flood position a reflection with large scattering angle and part shadow formation. In a position of the lens or the lens system, which is removed from the light exit opening of the light generating unit, a reflection with a small scattering angle and soft shadow formation is then generated in the spot position of the LED headlight.

If the lens or the lens system is adjusted for changing the reflecting angle of the LED headlight between the flood position, which is posterior in emission direction and adjacent to the light exit opening of the light generating unit for obtaining a larger scattering angle, and the spot position, which is anterior in emission direction and distanced to the light exit opening of the light generating unit for obtaining a small scattering angle with soft shadow formation, then the problem arises that the lens or the lens system in the posterior flood position comprises such a large scattering angle that the headlight housing requires a lens barrel with a very large diameter in which the lens or the lens system is moved forward and backward for changing the emission characteristic.

As an alternative the lens or the lens system could be adjusted together with the headlight equipment, which is arranged in front of the lens or the lens system, what however is also problematic in particular in case of a long adjustment path, in inclination of the LED headlight out of the horizontal downwards or upwards or in case of heavy equipment, as for instance motorized barn doors.

It is furthermore problematic to adjust the lens or the lens system together with the headlight equipment precisely along the optical axis of the LED headlight. A further problem is that the distance of the light exit area of the LED headlight to an object illuminated by the LED headlight is changed, what leads to a change of the area of the object illuminated by the LED headlight.

A further object is thus to allow a change of the illuminating characteristic of the LED headlight between a flood position with a large scattering angle and a spot position with a low scattering angle with an easy handling and a precise change of the reflecting angle without structural changes of the LED headlight and change of the distance of the light exit area of the LED headlight towards the object.

By arranging a cylinder-like lens barrel in the luminaire or headlight housing and a cartridge containing the light generating unit and a field lens at the light exit area of the LED luminaire, which are arranged relatively movable towards each other in the lens barrel, an easy handling and precise change of the reflecting angle is guaranteed, since the required control elements can be further on arranged on the stationary luminaire or headlight housing and the position of the guiding of the cartridge receiving the light generating unit or the field lens along the optical axis can be maintained. Since the light exit opening of the LED headlight has to be only insignificantly larger than the field lens or the field optic system, no constructional modification of the LED headlight is required. Since the light exit area is arranged at the stationary part of the LED headlight, also no change of the distance of the light exit area of the LED headlight to the illuminated object occurs.

By connecting the light shaping device fixed to the luminaire or headlight housing to the headlight equipment such as lens boards movable against each other leaf barn door, grids, diffuser, scrims, gobos, holographic scattering sheets or such it is further on guaranteed that heavy equipment as motorized leaf barn doors does not have to be moved when changing the reflecting angle of the LED headlight such that the handling of the LED headlight is being further simplified and no complex guiding devices resisting high adjustment forces are required.

The cartridge with the light generating unit is preferably adjustable along the optical axis of the LED headlight relative to the field lens, which forms a unit with the luminaire or headlight housing tightly connected to the light shaping device, what provides a significant advantage during production, handling and precision of the guiding as well as the distance of the light exit area of the LED headlight to the object relative to an adjustment of the lens or lens system and the headlight equipment along the optical axis of the LED headlight.

The cartridge with the light generating unit is preferably guided manually or electrically longitudinally adjustable in the luminaire or headlight housing such that an exact adjustment of the light generating unit along the optical axis of the LED headlight and an easy adjustment of the light distribution (flood, spot) are guaranteed.

In order to simplify and make precise adjustments of the half scattering angle of the LED headlight an adjustment device for longitudinal adjustment of the cartridge can be provided between the luminaire or headlight housing and the lens barrel, which is connected as a manual adjustment device to an adjustment lever guided towards the outside of the basis housing or an adjustment wheel or comprises as electronic adjustment device an electronically driven spindle or rack gear.

Pivot joints can be joined furthermore arranged on the luminaire or headlight housing, which are connected to a retaining bracket or a tripod.

The cartridge of the light generating unit is formed as a hemisphere on its backside being opposite to the light exit opening of the LED headlight and comprises cooling ribs on its hemisphere-shaped backside, via which the heat being received from the cooling device and being dissipated by the light generating unit is discharged to the outside.

Figure 5:
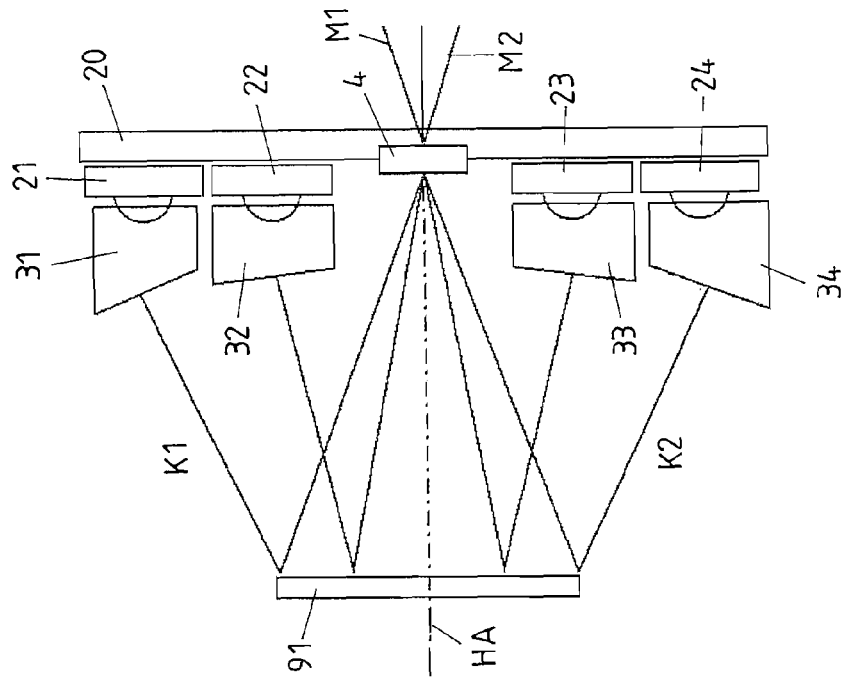
Figure 7:
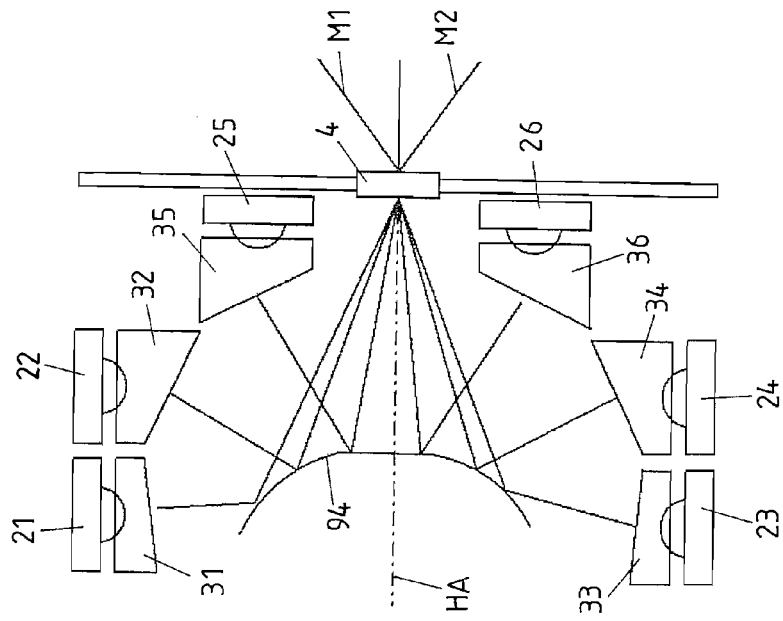
Figure 6:
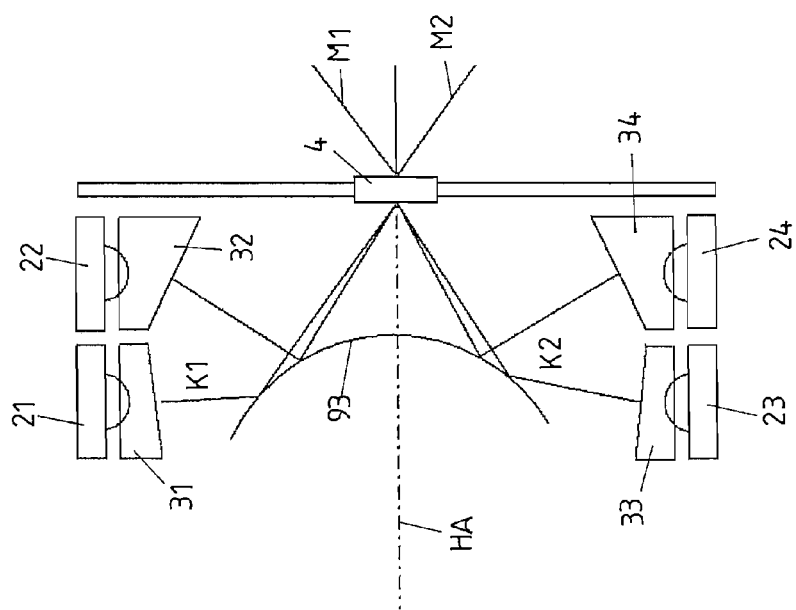
Figure 10:
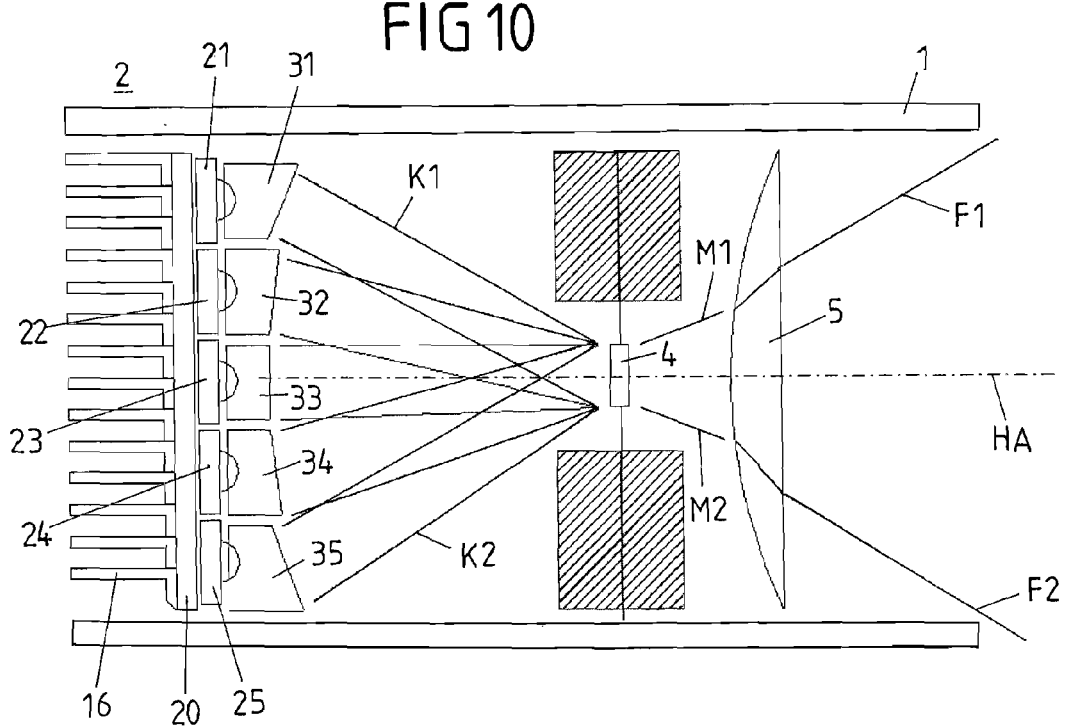
Figure 11:
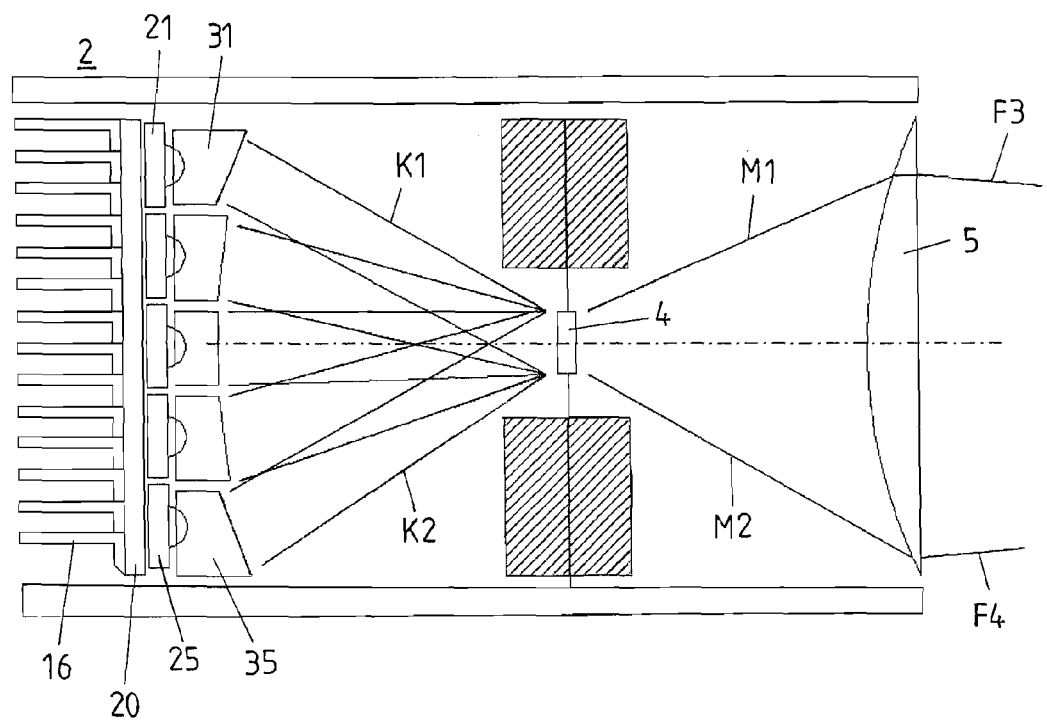
Figure 12:
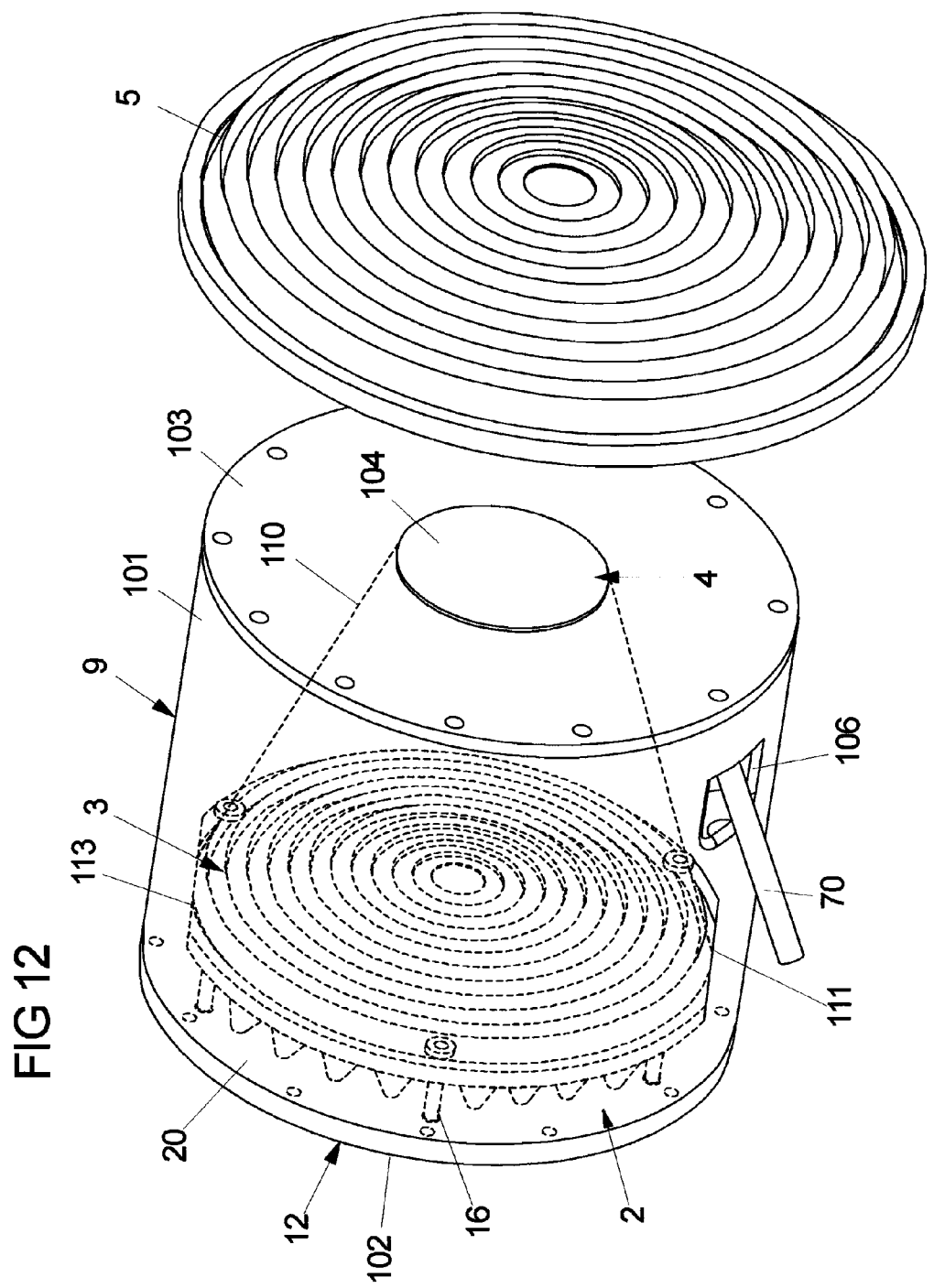
Figure 13:
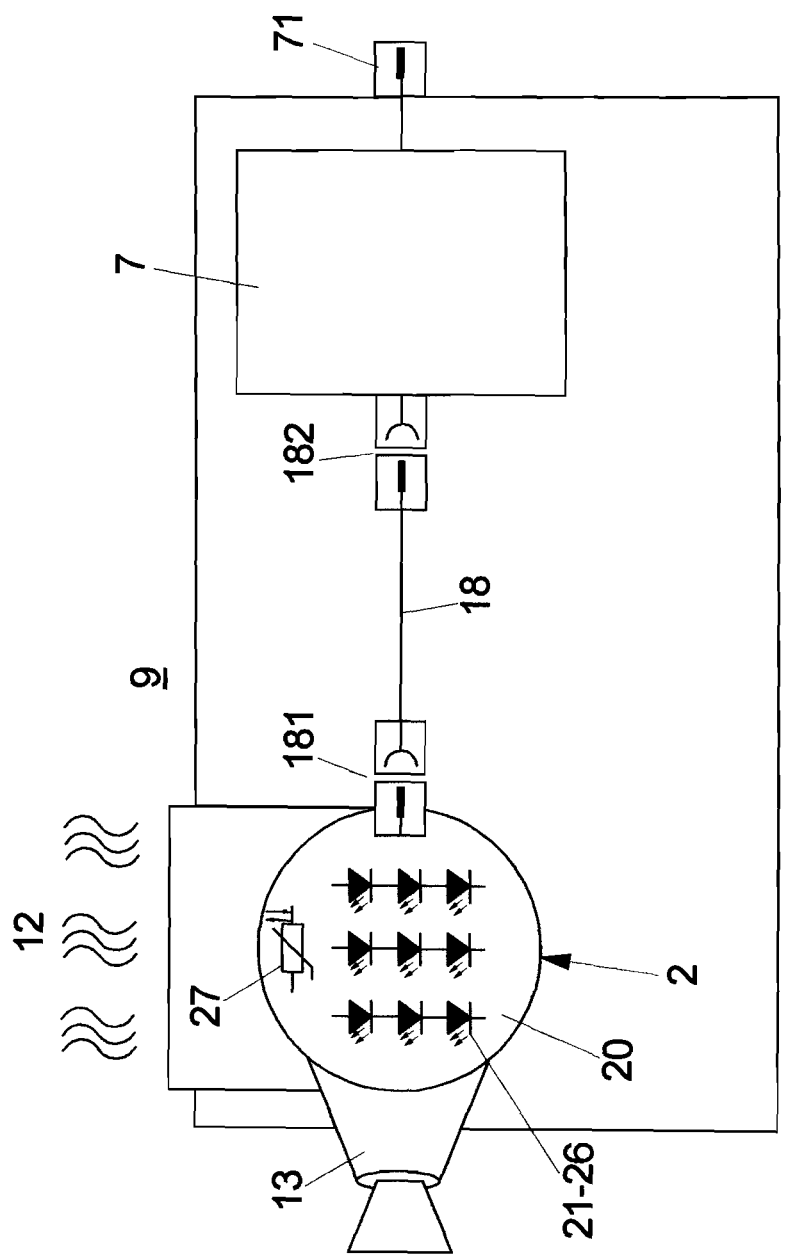
Figure 14:
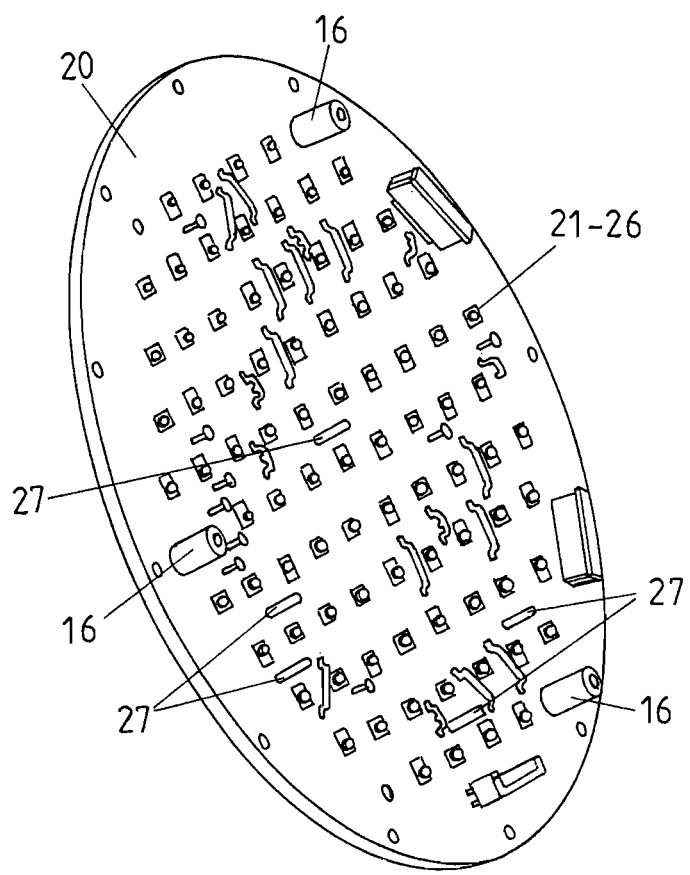
Figure 15:
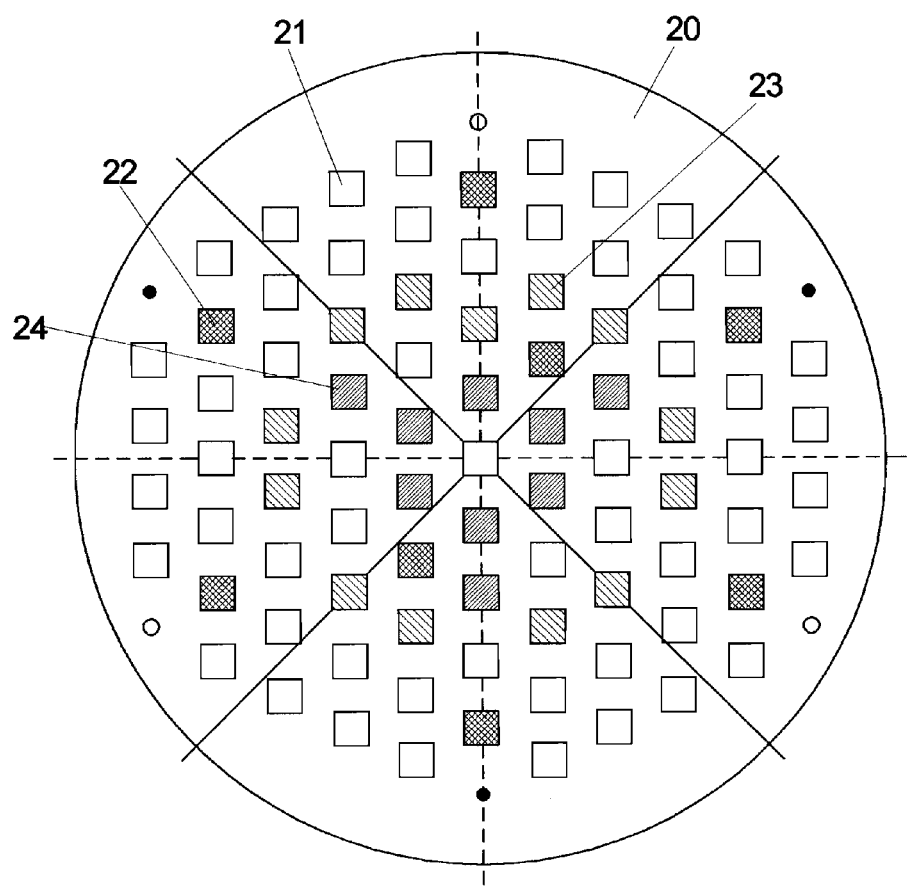
Figure 16:
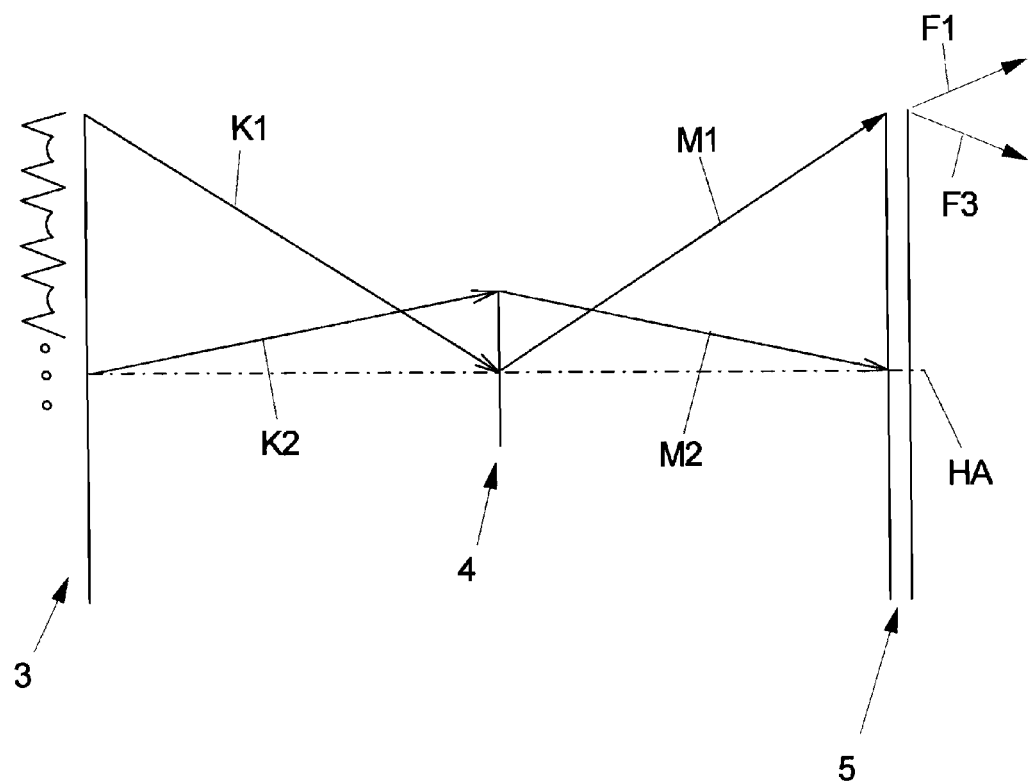
Figure 17:
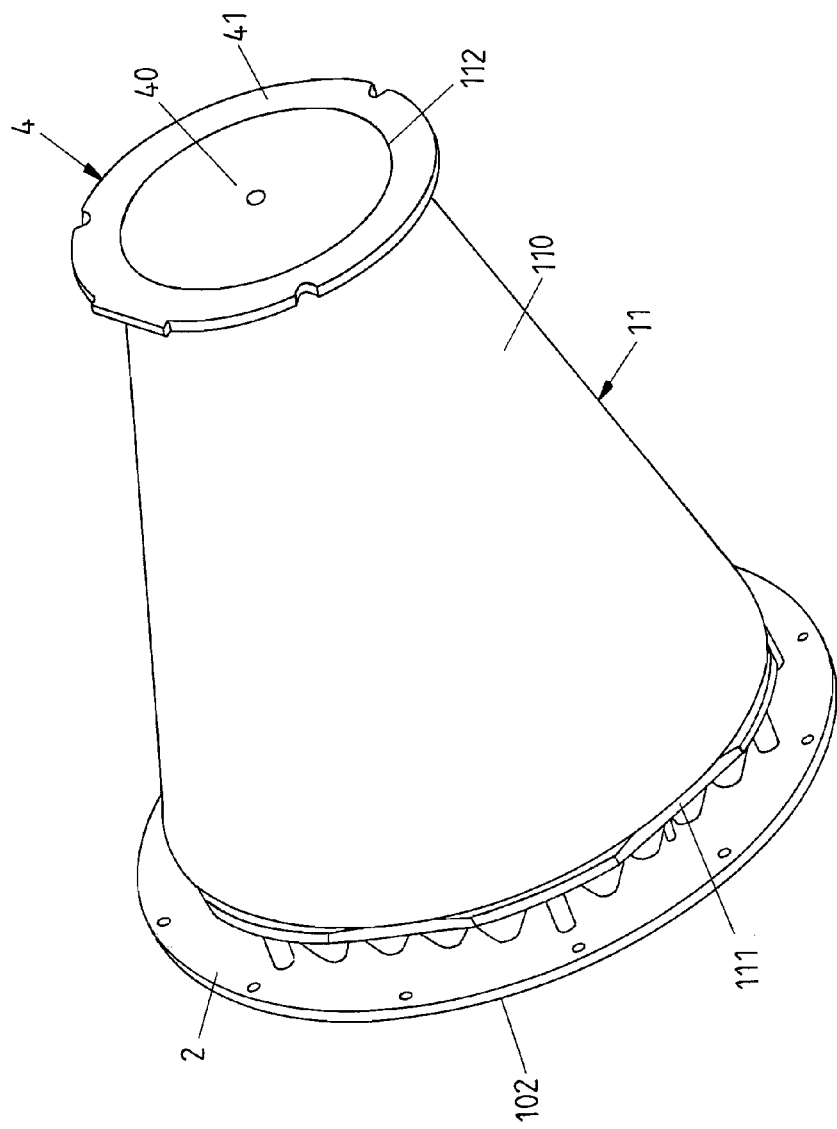
Figure 18:
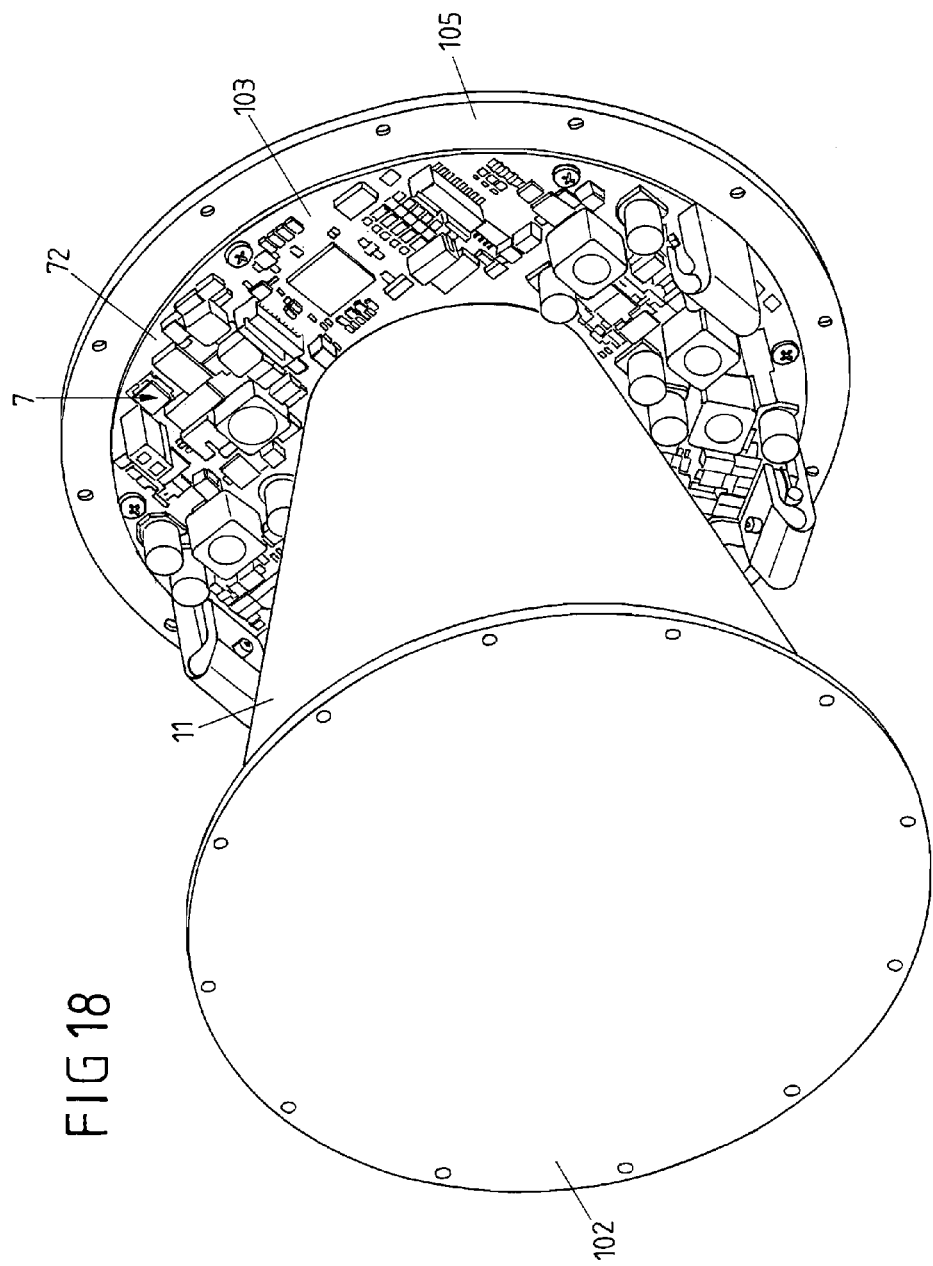
Figure 22:
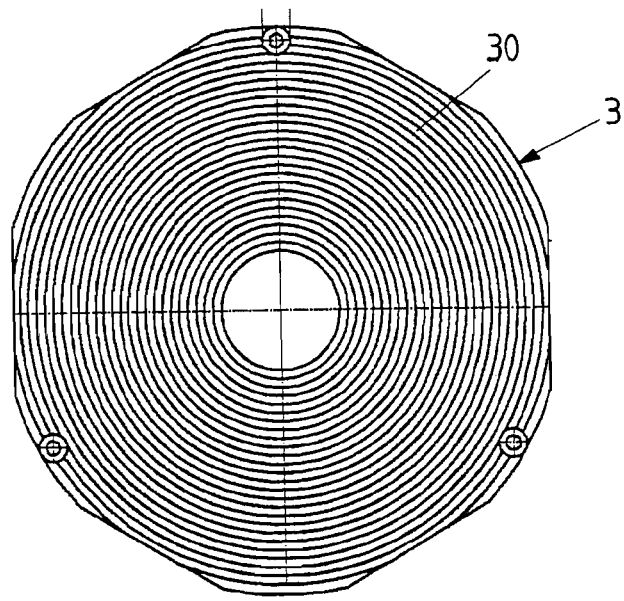
Figure 23:
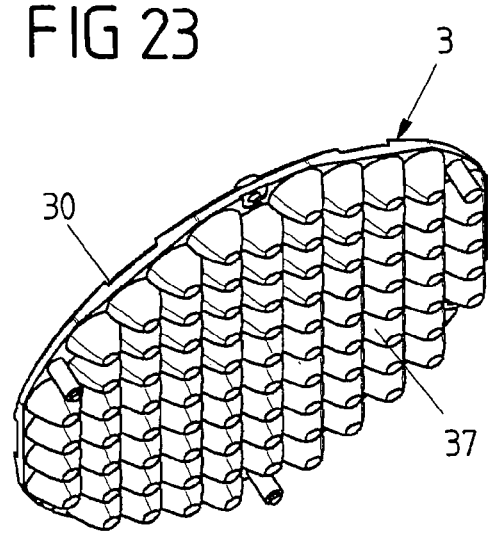
Figure 25:
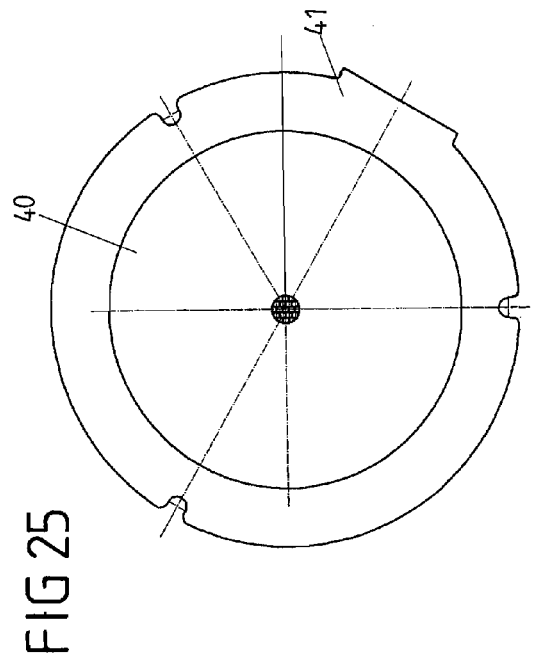
Figure 24:
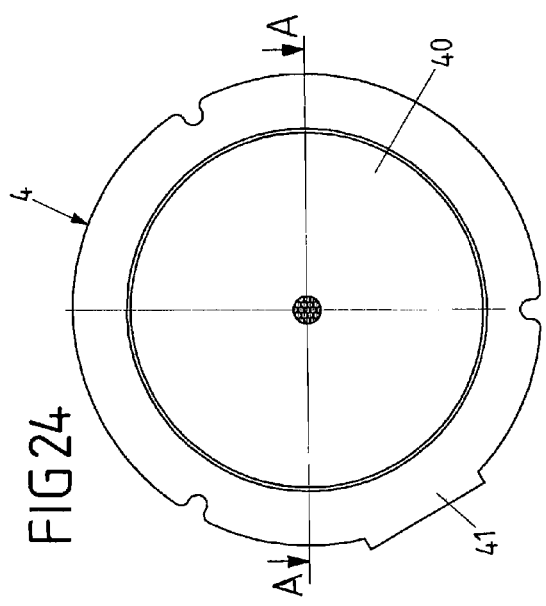
Figure 26:
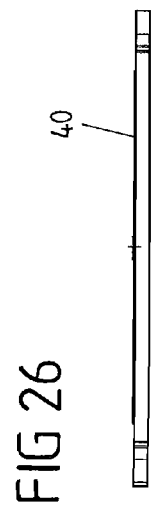
Figure 27:
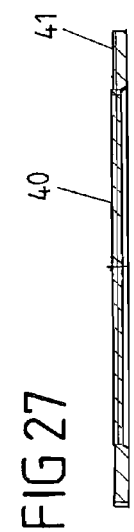
Figure 29:
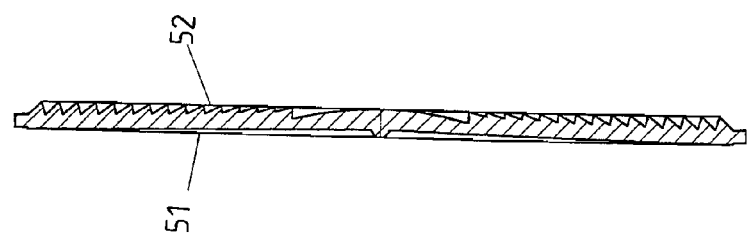
Figure 28:
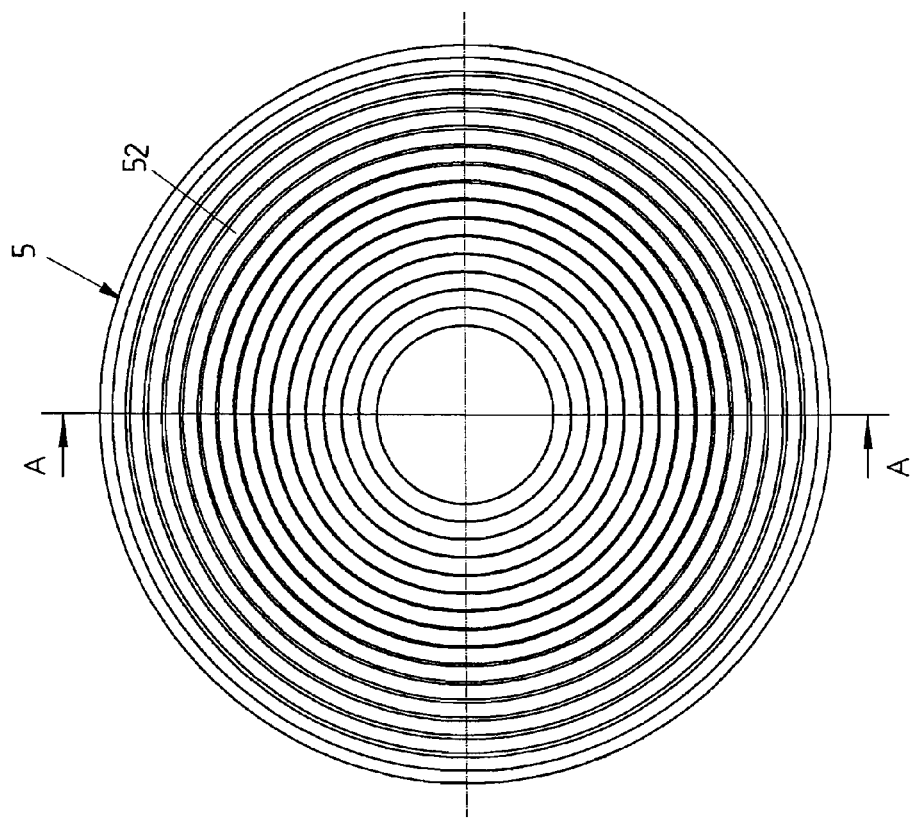
Figure 31:
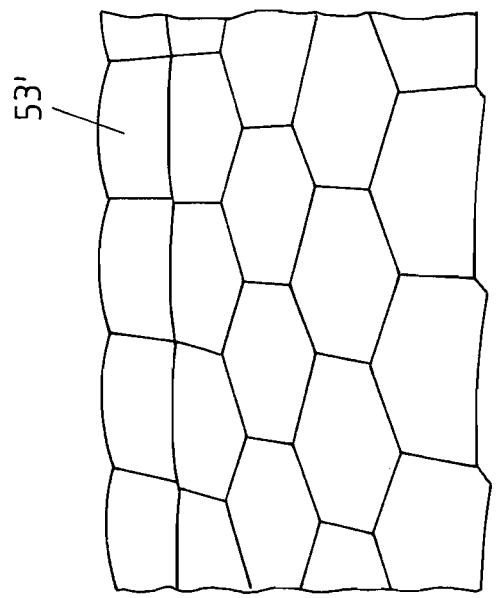
Figure 30:
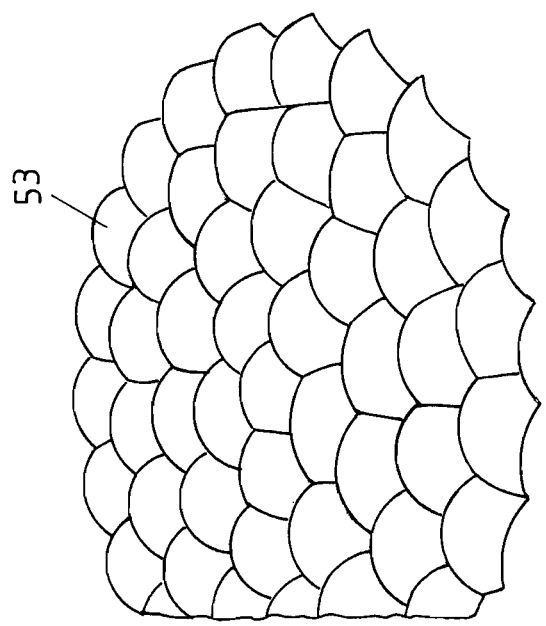
Figure 32:
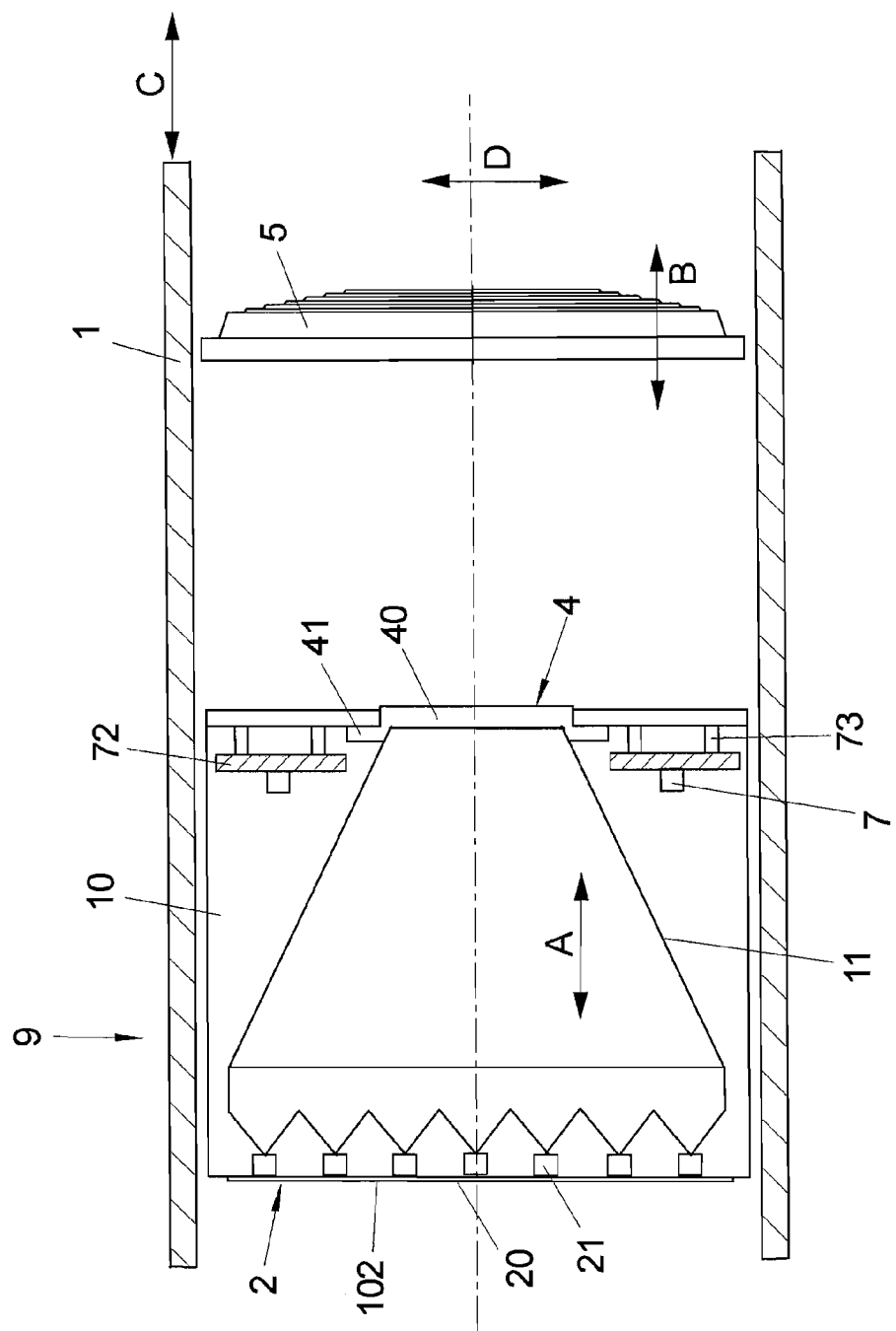
Figure 37:
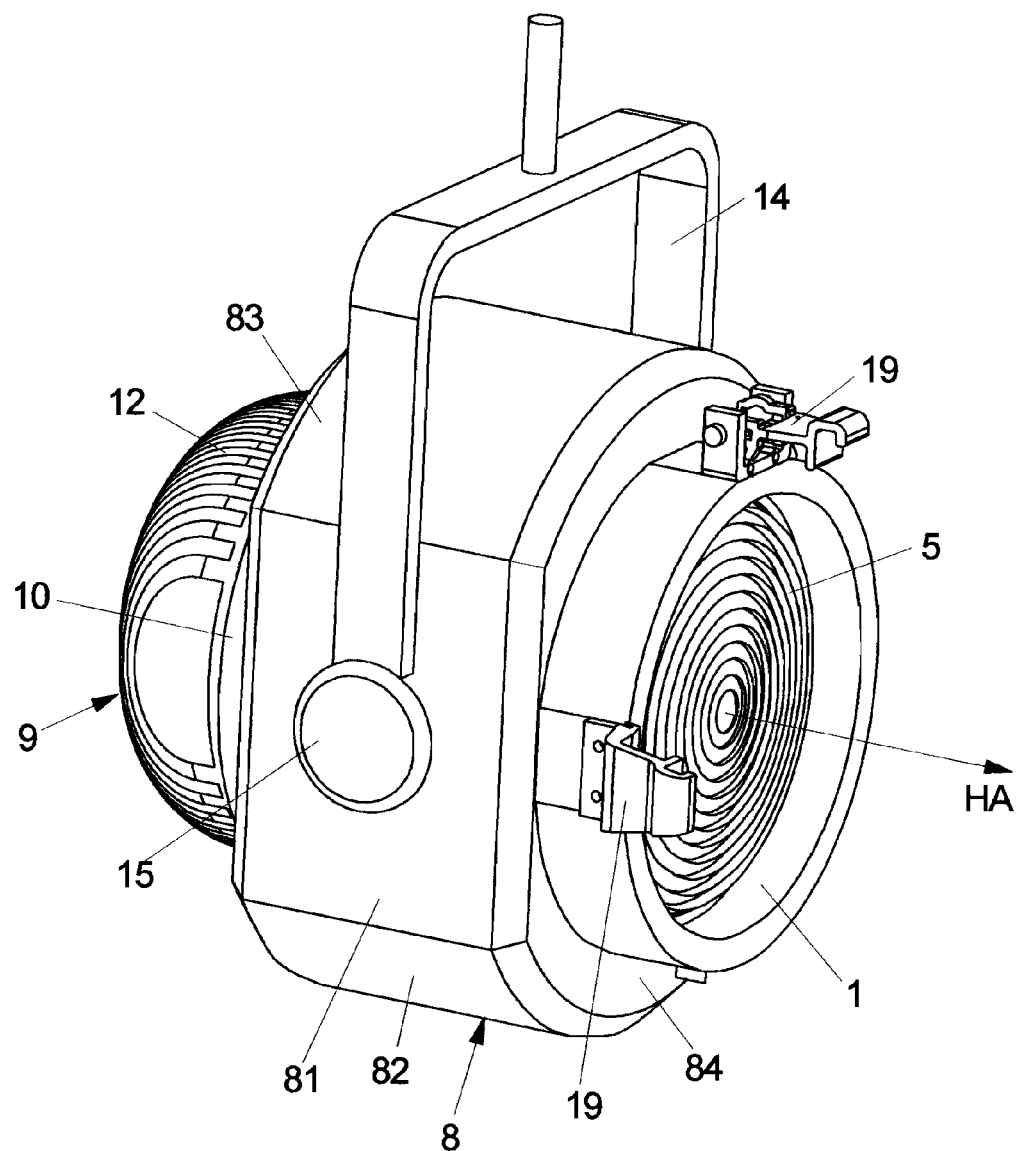
Figure 38:
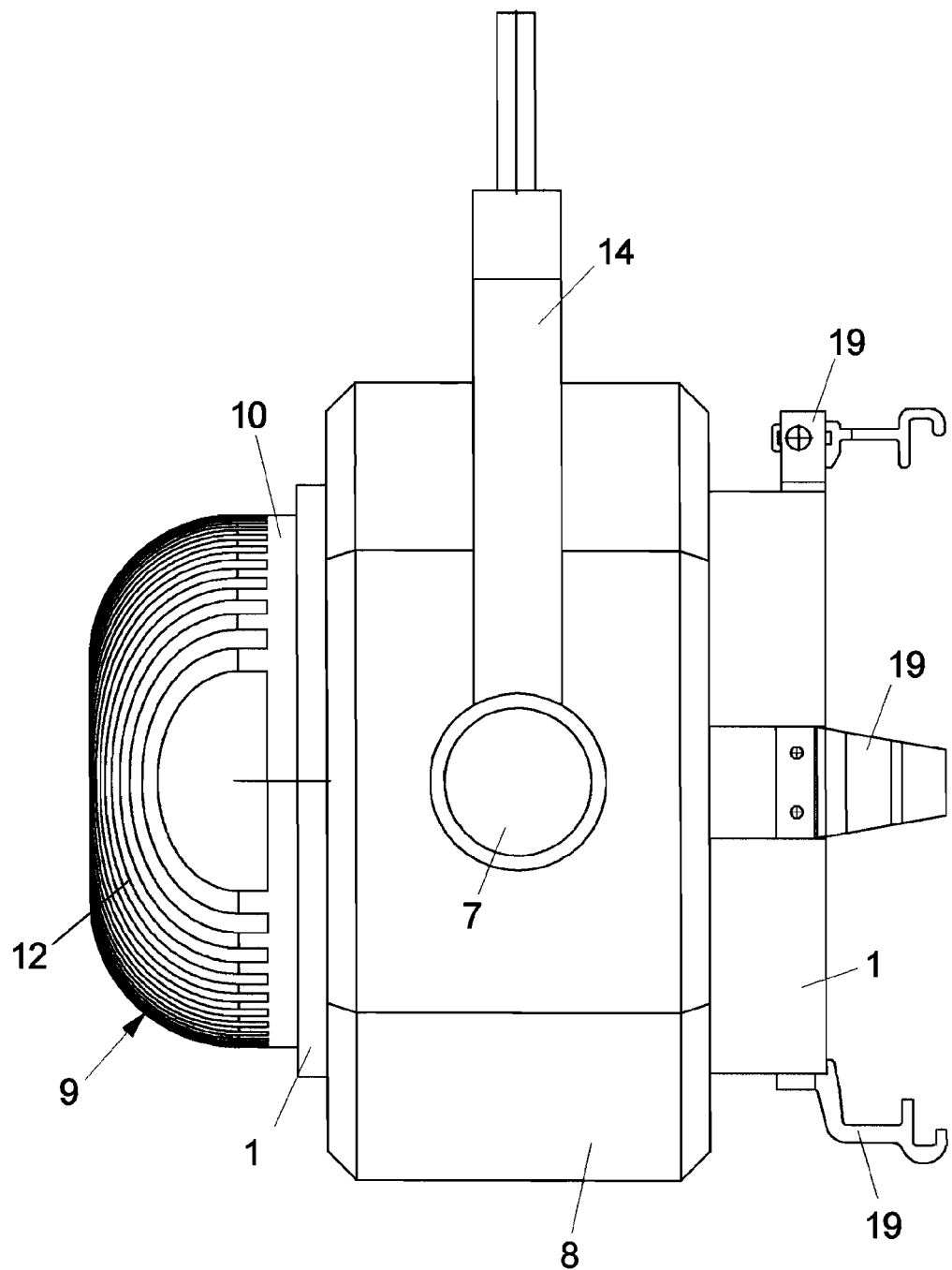
Figure 39:
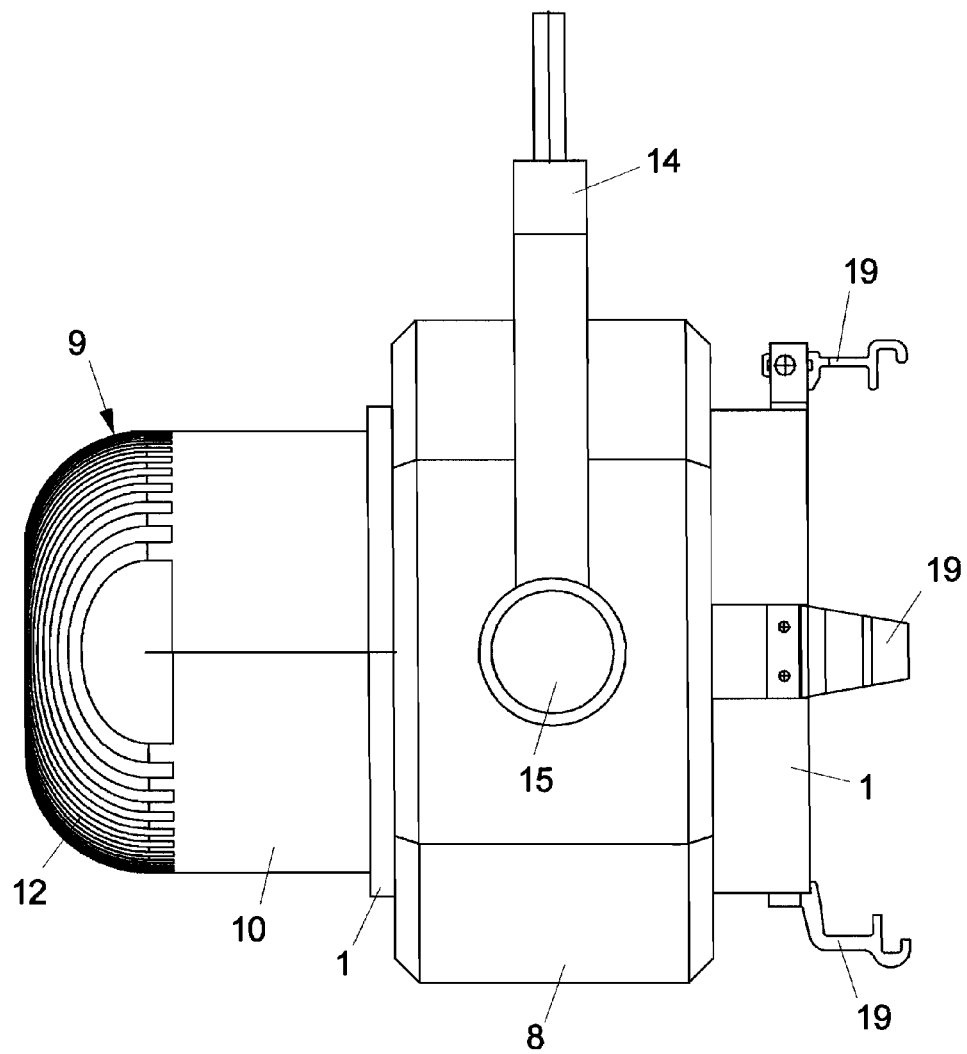

The idea forming the basis of the invention shall be explained by the means of the embodiments illustrated in the drawings and further embodiments shall be described. It shows:

FIG. 1 a schematic block illustration of the optical system according to the invention for a LED luminaire, in particular for an LED headlight;

FIG. 2 a schematic illustration of an active light source with LEDs arranged on a plane plate or board and emitting light in the same direction;

FIG. 3 a schematic illustration of an active light source with LEDs arranged on the inside of a curved area and emitting light towards the centre of curvature or focus point of the curved area;

FIG. 4 a schematic sectional view of an active light source with LEDs arranged on a board and collimation optics, a mixing optics inserted into the board and a plane reflector reflecting the light of the active light source to the mixing optics;

FIG. 5 a schematic sectional view as in FIG. 4 with a concave-curved or cone-shaped reflector;

FIG. 6 a schematic sectional view of an active light source with LEDs arranged in one or multiple rings about the optical main axis of the LED luminaire and collimation optics and a preferably facetted reflector, which is convex curved or cone-shaped;

FIG. 7 a schematic sectional view of an arrangement of the LEDs combined from the arrangements according to FIGS. 4-6 and collimation optics (5), the mixing optics and a concave curved reflector;

FIG. 8 a schematic sectional view of a mixing optic designed as a diffuser disc or as a diffuser with entry side structure and/or exit side structure;

FIG. 9 a schematic sectional view of a mixing optic designed as a diffuser with exit side intensifier;

FIG. 10 a schematic illustration of an optical system of an LED headlight with a honeycomb condenser in a flood position of a LED headlight;

FIG. 11 a schematic illustration as in FIG. 10 in a spot position of the LED headlight;

FIG. 12 a schematic perspective illustration of a LED headlight with a light generating unit arranged in a cartridge and a field optics designed as a Fresnel lens;

FIG. 13 a schematic illustration of the intersections of the light generating unit;

FIG. 14 a schematic illustration of a LED board loaded with LEDs and NTC resistors;

FIG. 15 a schematic illustration of the colour distribution of colour LEDs arranged on the LED board according to FIG. 14;

FIG. 16 a schematic outline of the optical beam path of the LED headlight;

FIG. 17 a perspective illustration of the active light source, collimation optics and mixing optics and a truncated cone-shaped reflector, FIG. 18 a perspective illustration of the arrangement according to FIG. 17 with the view of a control electronics, which is arranged on a ring flange arranged around the mixing optics;

FIG. 19 a top view of the light entry side of the collimation optics;

FIG. 20 a side view of the collimation optics according to FIG. 19;

FIG. 21 a cross view of the collimation optics along the line A-A according to FIG. 19;

FIG. 22 a top view of the light exit side or the collimation optics;

FIG. 23 a perspective view of the collimation optics;

FIG. 24 a top view of the light entry side of a condenser used as mixing optics;

FIG. 25 a top view of the light exit side of a condenser according to FIG. 24;

FIG. 26 a side view of the condenser according to FIG. 24;

FIG. 27 a cross view of the condenser along the line A-A according to FIG. 24;

FIG. 28 a top view of the light exit side of a Fresnel lens used as field optics;

FIG. 29 a cross view of the Fresnel lens along the line A-A according to FIG. 28;

FIG. 30 a perspective section of the centre of the light entry side of the Fresnel lens according to the FIG. 28 and FIG. 29;

FIG. 31 a perspective section of the edge of the light entry side of the Fresnel lens according to FIG. 28 and FIG. 29;

FIG. 32 a schematic longitudinal cross view of the LED headlight according to the FIG. 12-31;

FIG. 33-36 different schematic illustrations of the light emission in flood and spot positions of the LED headlight;

FIG. 37 an isometric illustration of an LED headlight with a base housing and an adjusting housing with a light generating housing, which is adjustable relative to the basis housing along the optical axis of the LED headlight;

FIG. 38 a side view of the LED headlight according to FIG. 1 in a flood position of the light generating unit with a large scattering angle and FIG. 39 a side view of the LED headlight in a spot position of the light generating unit with a small scattering angle.

FIG. 1 shows in a block illustration the main components of the optical system from LED luminaire, which are arranged in a usually hollow cylindrical housing 1. An active light source 2 (light engine) consists of multiple same or different coloured LEDs which are arranged alternatively on a plane or curved surface and are optionally provided with primary optics installed by the manufacturer of the LEDs. The light emitted by the LEDs of the active light source 2 is guided in emission direction a through the LED luminaire and is reflected or reshaped by the following components such that the light beams are given off in the desired manner to the following component respectively or are given off on the light exit side of the LED luminaire into the far field.

Two alternative embodiments of the active light source 2 are illustrated in FIGS. 2 and 3.

FIG. 2 shows the arrangement of LEDs 21, 22, 23 on a plane area 20 which gives off the light beams L1, L1', L12' in emission direction A. A plate or board in form of a metal core board, epoxy resin board or ceramic board can be used as a plane area. This arrangement has the advantage of an automatic loading of the plane plate or board with the LEDs 21, 22, 23 which can be optionally loaded together with other components and be electrically contacted. The disadvantage is that each element of the subordinated collimation optics 3, which is assigned to the single LEDs 21, 22, 23, is designed differently since each LED 21, 22, 23 emits in a different angle in relation to the subordinated mixing optics 4.

FIG. 3 shows in a schematic illustration this arrangement of LEDs 21, 22, 23 of the active light source 2 on the inside of a curved area 200 formed as a hollow sphere, hollow parabola or aspheric hollow area. The LEDs 21, 22, 23 emit light L2, L3, L4 towards the centre of curvature or focus point of the curved area 200. The advantage hereby is that similar collimation optics can be used for multiple or all LEDs 21, 22, 23, since the LEDs 21, 22, 23 already give off light in the desired emission direction. The disadvantage is a more complicated assembly and a more complicated electrical connection of the LEDs 21, 22, 23 of the curved area 200 and as well as a larger distance of the LEDs 21, 22, 23 towards each other depending of the height of the LEDs 21, 22, 23 and the collimation optics assigned to the LEDs 21, 22, 23.

The light emitted by the active light source 2 is collimated or focussed in the collimation optics 3 in a point or in a plane, wherein the collimation optics consists of singular lenses, which are superimposed onto the singular LEDs or which are connected as primary optics to the LEDs by the manufacturer or it consists of a lens system, which is assigned to groups of LEDs or all LEDs. Collimating or focussing lenses or lens systems are used as collimation optics 3, preferably made of optical plastics which catch a possible high amount of the light beams given off by the LEDs of the active light source 2 and emit in emission direction with a desired light distribution. TIR-lenses (Total Internal Reflection) are preferably used for optimizing the efficiency of the LED luminaire.

As previously mentioned the collimation optics 3 can depending on the arrangement of the LEDs 21, 22, 23 of the active light source 2 on a plane area 20 or curved area 200 consist of similar, discreet optical elements superimposed of the LEDs 21, 22, 23 or can consist of discreet optical elements with different emission direction or can be alternatively provided as complete optic board with inserted optical areas.

The light beams K1, K2 given off by the collimation optics 3 are optionally guided over an optical device 6, which contains optical elements as lenses or reflectors, which reflect or reshape the light K1, K2 given off by the collimation optics such that it is passed in the desired manner as light beams E to the subordinated mixing optic 4.

In FIGS. 4 to 7 different space saving arrangements of an active light source with LEDs and collimation optics connected to the LEDs, a mixing optic and a reflector are illustrated.

FIG. 4 shows an arrangement with LEDs 21 to 24 arranged on plane board 20 with superimposed collimation optics 31 to 34. The board 20 is in the plane of the mixing optics 4 and comprises a central opening for receiving the mixing optics 4 in the optical main axis HA of the LED luminaire such that the LEDs 21 to 24 are arranged ring-like around the mixing optics 4 with the collimation optics 31 to 34 arranged thereon. The reflector 91 designed as a plane mirror is arranged in a distance to the board 20 wherein said reflector reflects the light beams K1, K2 of the collimation optics 31 to 34 emitted in the opposite direction of the mixing optics 4 to the mixing optics 4, which gives off the mixed light, via its light exit area, which is characterized by the edge beams M1 and M2.

Due to this arrangement only half of the length between the LEDs 21 to 24 or collimation optics 31 to 34 and the mixing optics 4 is required for possibly complete illumination of the light entry area of the mixing optics 4.

FIG. 5 shows a modification of the arrangement according to FIG. 4 the arrangement of a reflector, which is designed concavely curved or cone-shaped and preferably a facetted mirror, which reflects the light K1, K2 given off by the LEDs 21 to 24 via the collimation optics 31 to 34 back to the mixing optics 4 arranged in the optical main axis HA of the LED luminaire. Due to the arrangement of the concavely curved or cone-shaped and preferably facetted mirror as reflector 92 the use of straight-emitting and thus identically realized collimation optics 31 to 34 is possible.

FIG. 6 shows an embodiment with a convex curved to cone-shaped and preferably facetted reflector 93 and LEDs 21 to 24 arranged in a ring or multiple rings around the optical main axis HA of the LED luminaire with collimation optics 31 to 34 arranged thereon. The convex curved to cone-shaped and preferably facetted reflector 93 reflects the light K1, K2 emitted by the LEDs 21 to 24 via the collimation optics 31 to 34 back to the mixing optics 4 arranged in the optical main axis HA of the LED luminaire, which gives off the light with the edge beams M1, M2 to the subordinated optical devices.

In this embodiment also similar collimation optics 31, 33 or 32, 34 can be used for each ring and due the cylindrical shaped arrangement of the LEDs 21 to 24 optimal heat dissipation via the hollow cylindrical housing of the LED luminaire is guaranteed.

As an alternative a polygonal outer cover can be used for receiving the LEDs 21 to 24 or a polygonal housing form of the LED luminaire can be used for simplified assembly and electrical contacting of the LEDs 21 to 24, if simultaneously collimation optics 31 to 34 are used, which reflect the light given off by the LEDs 21 to 24 in two different directions.

In the embodiment according to FIG. 7 a ring-like or polygonal arrangement of the LEDs 21 to 24 with the assigned collimation optics 31 to 34 is combined with LEDs 25, 26 arranged on a plane area with assigned collimation optics 35, 36 for obtaining a higher power density, wherein the plane with the LEDs 25, 26 is in the plane of the mixing optics 4 and is for instance designed as a board with a central opening for receiving the mixing optics 4. This arrangement is provided with a combined reflector 94, which comprises a plane area for reflection of the light beams given off by the LEDs 25, 26 or the assigned collimation optics 35 and 36 and comprises a concave arced area for the light beams given off by the LEDs 21 to 24 arranged circular or polygonal and collimation optics and by the collimation optics 31 to 34.

The mixing optics consists of one or multiple optical elements, which mix the occurring light beam in colour. The mixing optics 4 acts on its exit side as secondary or passive light source, which gives off light beams M1, M2.

Two embodiments of the mixing optics 4 are illustrated in the FIGS. 8 and 9.

The mixing optics illustrated as a sectional view in FIG. 8 consists of a diffuser disc or a diffuser body 60 with a more or less strong scattering, which scatters the occurring light beams E in a number of beams M1 given off in different directions. A milk glass pane, a diffuse plastic plane or a diffuse hemisphere of plastic are in particular usable as diffuser disc or body. Instead of a diffuser disc or a diffuser body a translucent diffuser 61 can also be optionally used, which is provided with a structure on the light entry side and/or the light exit side for instance in form of honeycombs, prisms, micro lenses or such.

In the embodiment according to FIG. 9 the mixing optics consists of a diffuser with an intensifier on the light exit side in form for instance of a cone 62 mirrored inside which reflects the light beams M1 striking said cone into the cone inside as light beams M2 and serves to reduce the reflecting angle in analogy to a taper.

The beams M1, M2 given off by the mixing optics 4 are guided when required via optical element 7, in which the light given off by the mixing optics 4 with the edge light beams M1, M2 is reflected or reshaped such that the edge light beams M1, M2 given off by the further optical element 7 strike in a subordinated field optics 5 such that a desired light distribution is provided in the far field. The further optical elements can be plane or curved mirrors, converging lenses, diverging lenses, fibres or light mixing rods.

Beside the embodiments of the mixing optics 4 described by the means of the FIGS. 8 and 9, a honeycomb condenser or a light mixing rod or taper can be alternatively used.

A singular converging lens or lens system with predominantly displaying properties can be used as field optics 5. In case of a field optics 5 designed as a singular converging lens, the exit area of the mixing optics 4 or the secondary or passive light source is displayed into the far field and for obtaining a variable reflecting angle the converging lens has different distances to the mixing optics 4.

A convex lens, plane convex lens, aspheric converging lens, Fresnel lens or Fresnel lens with incorporated scattering structure (NOFS lens) can be used as converging lens. The entry and exit side of the converging lens can be provided with a structure, for instance a honeycomb, prism, micro lens or regular or irregular diffuser structure for obtaining a better colour mixing and/or for obtaining a soft continuation of the light field.

A field optics 5 designed as a lens system with predominantly displaying properties displays the exit area of the mixing optics 4 or a plane in front thereof accurately into a far away plane.

A zoom optics or a projection optics can be used as a lens system with predominantly displaying properties.

A concrete embodiment of the LED luminaire in a schematic longitudinal sectional view is illustrated in the FIGS. 10 and 11.

An active light source 2 comprises multiple LEDs 21, 22, 23, 24, 25 arranged on a plane board 20 connected to a cooling body 26 wherein collimation optics 31, 32, 33, 34, 35 assigned to the singular LEDs 21, 22, 23, 24, 25 are superimposed onto the respective LEDs, which collimate or focus the light emitted by the LEDs 21 to 25 corresponding to the entering light beams K1, K2 to a mixing optics 4. The light mixed in colour by means of the mixing optics 4 for instance designed as a honeycomb condenser is given off with the edge light beams M1, M2 to a field optics 5 close to the mixing optics 5, for instance in form of a Fresnel lens with incorporated scattering structure (NOFS lens), which gives off in this flood position of the LED luminaire diverging edge light beams F1, F2 to the far field.

As an alternative thereto the field optics 5 is according to the schematic sectional view according to FIG. 11 in a position removed from the mixing optics 4 such that the edge light beams M1, M2 are given off as converging edge light beams F3, F4 in the spot position of the LED luminaire to the far field.

Due to the radial space available between the mixing optics 4 and the housing 1 of the LED luminaire, the electronics of the LED luminaire can be arranged in the hatched illustrated area 8 in the inside of the LED luminaire. Since the heat given off by the LEDs 21 to 25 of the active light source 2 can be discharged via the cooling body 26 to the outside, the space 8 available for the electronics has a comparatively low temperature.

In the FIGS. 12 to 39 different LED headlights and the elements thereof are illustrated as embodiments of the variants of an LED luminaire illustrated in the FIGS. 1 to 11 and previously described.

FIG. 12 shows in a schematic perspective view a light generating unit 9 and a field optics 5 of an LED headlight arranged in the beam path of the light generating unit 9 and designed as Fresnel lens. The light generating unit 9 is arranged in a hollow cylindrical cartridge 10, which comprises a cylinder mantle surface 101, the front faces thereof being closed by a circular disc flange 102 and/or a circular disc-shaped LED board 20 with a thermal interface 12 and a ring flange 103. In a circular shaped opening 104 of the ring flange 103 of the cartridge a mixing optics 4 designed as a condenser is arranged as described in the following by the means of the FIGS. 24 to 27.

The LED board 20 comprises multiple LEDs on its surface facing the inner space of the cartridge 10 wherein the arrangement and distribution of said LEDs can be deduced from the illustration according to FIG. 15 and is explained in more detailed in the following.

The LED board 20 and/or the circular ring-shaped flange 102 of the cartridge 10 form a thermal interface on its outer surface directed outwards, wherein said interface is connected to a cooling body or a cooling medium to a cooling device with a movable cooling medium in particular to a fan for cooling the LEDs.

The LED board 20 is connected in emission direction of the LEDs to a collimation optics 3 illustrated in the FIGS. 19 to 23 via a spacer 16, wherein said collimation optics bundles the light emitted by the singular LEDs to the mixing optics 4 and according to the top view illustrated in FIG. 19, the side view illustrated in FIG. 20, the sectional view along the line A-A according to FIG. 19 and illustrated in FIG. 21 and the perspective complete view according to FIG. 23 comprises on its light entry side a collimator facing the circular disc-shaped LED board 20 with cone-shaped total reflection lenses 37 directed to the singular LEDs of the active light source 2 and comprises on its light exit side a levelled lens structure according to the type of a Fresnel lens. The cone-shaped total reflection lenses collect the light emitted by the LEDs arranged on the LED board 20 over a large width with a maximum spatial angle or are arranged with their light entry side immediately in front of the LEDs. The length of the spacers 16 is dimensioned for this purpose such that the cone-shaped total reflection lenses end in an optimal distance shortly before the LEDs arranged on the LED board 20.

The mixing optics 4 consists in this embodiment of a honeycomb condenser illustrated in FIG. 24 in a top view of the light entry side, in FIG. 25 in a top view of the light exit side, in FIG. 26 in a side view and in FIG. 27 in a sectional view along the line A-A, which comprises a light entry and light exit angle corresponding to the reflecting angle of the collimation optics 3 of for instance 25° and an optical effective area 40 as well as a mounting edge 41.

A truncated cone-shaped reflector with a metal surface 110, which is mirrored inside and is adjacent with its open base area 111 to the collimation optics 3 and is adjacent with its open deck area 112 to the mixing optics 4. Thereby the open base area 111 of the truncated cone-shaped reflector 11 passes into a hollow cylindrical reflector section 113, which is mirrored inside and which encloses the collimation optics 3, so that the light path emitted by the LEDs outwards is mirrored back to the collimation optics 3.

The cartridge 10 receiving the light generating unit 9 is designed as a compact unit with a hermetically closed water-tight housing, out of which an electrical and control cable 70 is passed via the opening 106 wherein said cable is connected to the LEDs and control electronics for the LEDs. As subsequently explained in more detail by the means of the FIGS. 30 to 39 the cartridge 10 containing the light generating unit 9 can be inserted in a lens barrel 1 of the headlight housing and can be tightly connected to said lens barrel or can be movably arranged within the lens barrel in longitudinal direction.

A field optics adjustable along the optical main axis HA can be inserted in light emission direction of the light generating unit 9 in front of the mixing optics 4 designed as a condenser wherein said field optics consists of a Fresnel lens 5 illustrated in the FIGS. 28 to 31, which receives a light emitted by the mixing optics 4 and emits the light with a light distribution as flood or spot light in a far field, wherein the light distribution is adjustable by the distance of the field optics 5 from the mixing optics 4.

FIG. 13 shows a schematic illustration of the intersections of the light generating unit 9 with the active light source 2, which comprises the LEDs 21 to 26 arranged on the LED board 20 as well as multiple, distributed arranged thermal sensors 27 which are preferably designed as NTC resistors and which detect the temperature of the LED board 20 in different temperature zones. On the LED board 20 there are for instance 85 LEDs 21 to 27 of different colours, which are combined in multiple colour channels, as well as 5 thermal sensors 27 designed as NTC resistors are arranged for detecting the temperature in different temperature zones. The LED board 20 is connected via the thermal interface 12 to a cooling medium, for instance a cooling body. The LED board is connected via an optical interface 13 to the previously described collimation optics, the beam path thereof is explained herein after.

The LED board 20 is connected via an interface 181 and an internal conductor 18 to an interface 182 of control electronics 7 on the control and power supply side, which is connected on the exit side via an electronical interface 71 amongst others to external control devices and a voltage supply. The control electronics 7 takes over the complete signal processing, temperature stabilisation and colourimetry of a light generation unit 9 and is also arranged within the hermetically closed cartridge 10.

FIG. 14 shows in a perspective illustration a view of the light emitting side of the LED board 20 with the LEDs 21 to 26 arranged on the LED board 20, the distributed arranged NTC resistors 27 for detecting the temperature on the LED board 20 in different temperature zones as well as the separator 16, via which the collimation optics 3 is connected to the LED board 20 of the active light source 2.

FIG. 15 shows in a top view of the LED board 20 the arrangement of a number of LEDs, of which the non-hatched illustrated LEDs 21 emit warm white light, the cross-hatched illustrated LEDs 22 emit red light, the left-hatched LEDs 23 emit green light and the right-hatched LEDs 24 emit blue light. As deducible from the schematic illustration of the LED colour arrangement according to FIG. 15 the blue LEDs 24 giving off short-waved light are arranged in the centre area and the LEDs 21 to 23 giving off long-waved light are arranged in the outer area of the LED board 20 due to the wave length depending reflection of the subordinated optical elements, since for instance the red light beams are reflected stronger than blue light beams. The number and the exact type of the LEDs 22 to 24 emitting the coloured light on the LED board 20 are preferably matched to a predetermined fixed colour temperature, for instance to a colour temperature between 2800° K and 6500° K or to a changeable colour temperature in this range.

The LED board 20 is designed as a plane circular disc area and consists in particular of a metal core board, epoxy resin board or ceramic board.

FIG. 16 shows in a schematic illustration the beam path of the LED headlight behind the optical interface 13 according to FIG. 13.

FIG. 17 shows in a perspective view the truncated cone-shaped reflector 11 with the metal surface 110, which is mirrored inside, and the open base area 111, which is adjacent to the collimation optics 3, and the open deck area 112 receiving the mixing optics 4, which corresponds to the opening 104 of the circular ring-shaped flange 103 of the cartridge 10.

FIG. 18 shows in a perspective view the truncated cone-shaped reflector 111 from the opposite direction with the circular ring-shaped flange of the cartridge 10, wherein the mixing optics 4 is inserted into the opening 104 of said reflector, which corresponds to the open deck area 112 of the truncated cone-shaped reflector 11, and wherein said mixing optics is connected to the circular ring-shaped flanged 103 with its mounting edge 41, wherein said flange comprises a circumferential mounting edge 105 with holes, wherein the cylinder mantle 101 of the cartridge 10 is fixed to said holes and the holes of the LED board 20 or the circular disc-shaped front face 102 of the cartridge 10.

The circular disc-shaped flange serves for receiving the control electronics 7 for controlling and power supply of the LEDs arranged on the LED board 20. The control electronic 7 is arranged on a circular ring board 71, which is connected according to FIG. 32 by studs 72 to the circular ring-shaped flange 103. The outer surface of the truncated cone-shaped reflector 11 the cylinder mantle 101 of the cartridge 10 and the inside of the ring flange 103 enclose a sufficiently large space for receiving the control electronics 7 and the heat given off by the components of the control electronics 7.

The field optics 5 designed as Fresnel lens is illustrated in FIG. 28 in a top view of the light exit side, in FIG. 29 in a sectional view along the line A-A of FIG. 28 and in the FIGS. 30 and 31 in a perspective section of the centre of the light entry side and of the edge of light exit side of the Fresnel lens. The Fresnel lens 5 comprises on the light entry side facing the mixing optics 4 a structuring 51 and on the light exit side a Fresnel structure 52. As deducible from the illustration according to FIGS. 30 and 31 the structuring 51 of the Fresnel lens 5 consists of a honeycomb structure with spiral-like arranged, pentagonal optical elements, which are strongly structured according to FIG. 30 in the centre of the light exit side of the Fresnel lens 5, while it forms only weak structures according to FIG. 31 on the edge of the light exit side of the Fresnel lens 5.

This specific structuring of the light entry side of the Fresnel lens 5 removes despite the light mixing properties of the mixing optics 4 colour effects, which are still present, such that the light mixed by the different colour LEDs is given off homogenously to the far field. In case of a plane light entry side of the Fresnel lens 5 the local light distribution on the light exit of the condenser of the mixing optic 4 would be displayed in an angular distribution, wherein the colours given off by the multi-coloured LEDs would not be absolutely homogenously distributed after the condenser due to its active principle such that colour effects would arise.

FIG. 32 shows in a schematic illustration a longitudinal section of an LED headlight with the components of the LED headlight previously explained by the means of the FIGS. 12 to 31, namely the lens barrel 1 of the headlight housing,
the light generating unit 9 with the cartridge 10 being tightly fixed in the lens barrel 1 or being arranged longitudinally adjustable in direction of the double arrow A within the lens barrel 1, wherein in said cartridge
the active light source 2 with the LED board 20 and the LEDs 21 to 26,
the collimation optics 3,
the truncated cone-shaped reflector 11, which is mirrored inside,
the mixing optics 4 designed as condenser and
the control electronics 7
are arranged and
the field optics 5 designed as Fresnel lens, which is arranged movably along the double arrow B within the headlight housing 1 in order to adjust the desired light distribution (flood, spot).

FIG. 32 shows also the different adjusting or setting possibilities for the light distribution of the LED headlight. The double arrow A indicates a longitudinal displacement of the cartridge 10 and thus the light generating unit 9 within the lens barrel 1 of the headlight, the double arrow B indicates a longitudinal adjustment of the field optic or Fresnel lens 5 within the lens barrel 1, the double arrow C indicates a longitudinal determination of the lens barrel 1 and the double arrow D indicates a diameter determination of the lens barrel 1. In order to clarify these adjusting and setting possibilities examples for the light distribution with corresponding adjustment of singular components of the LED headlight for spot and flood settings of the LED headlight are illustrated in the FIGS. 33 to 36.

Figure 33:
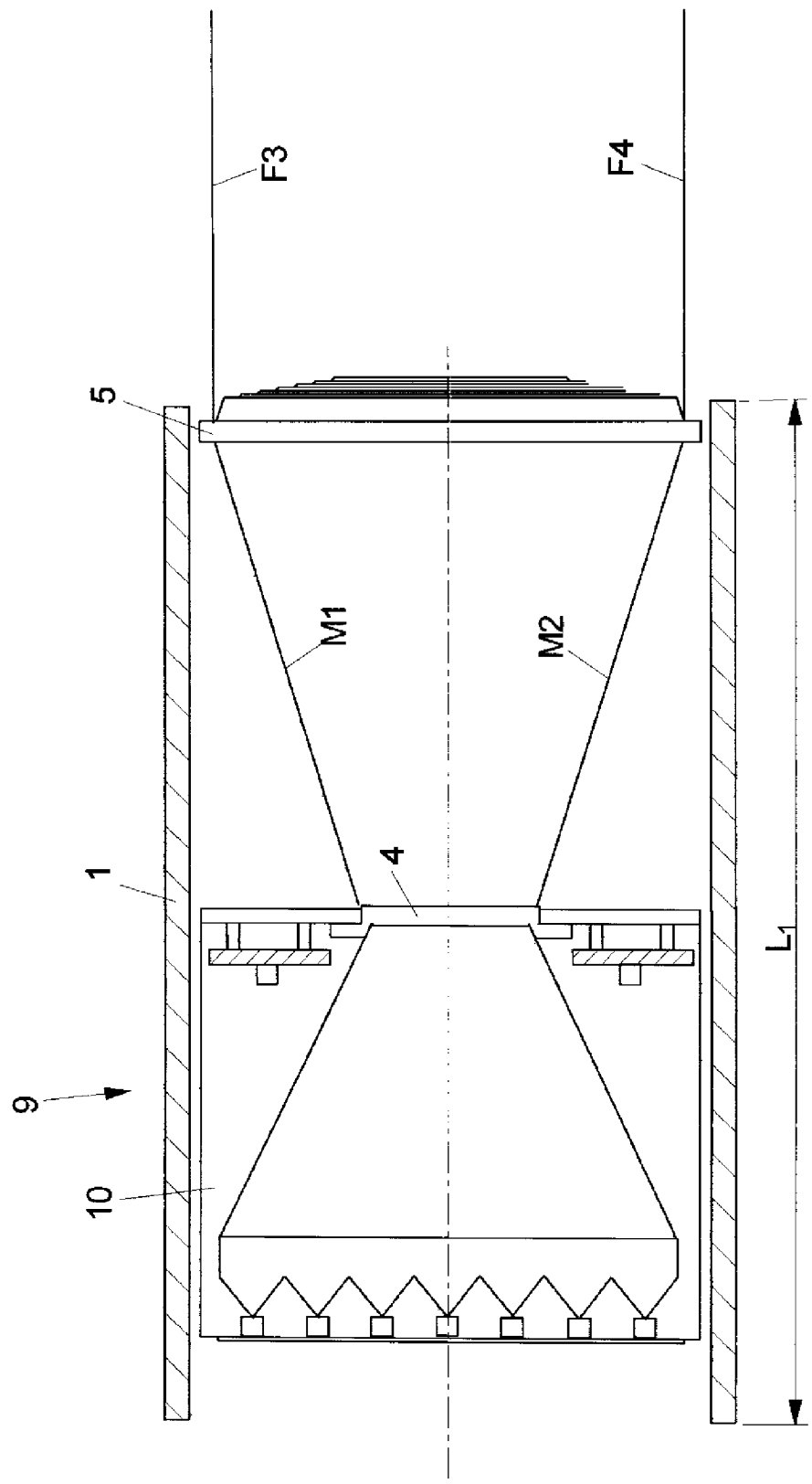

FIG. 33 shows the light distribution with the edge beams M1 and M2 between the mixing optics 4 and the field optics 5 as well as the emission of a field optics 5 into the far field with the edge beams F3 and F4 in a spot adjustment for which the field optics 5 was brought into front position within the lens barrel 1. The schematic illustration of FIG. 33 shows that when adjusting the field optics 5 within the lens barrel 1 with the length L1 an undisturbed beam path in the spot adjustment is provided.

Figure 34:
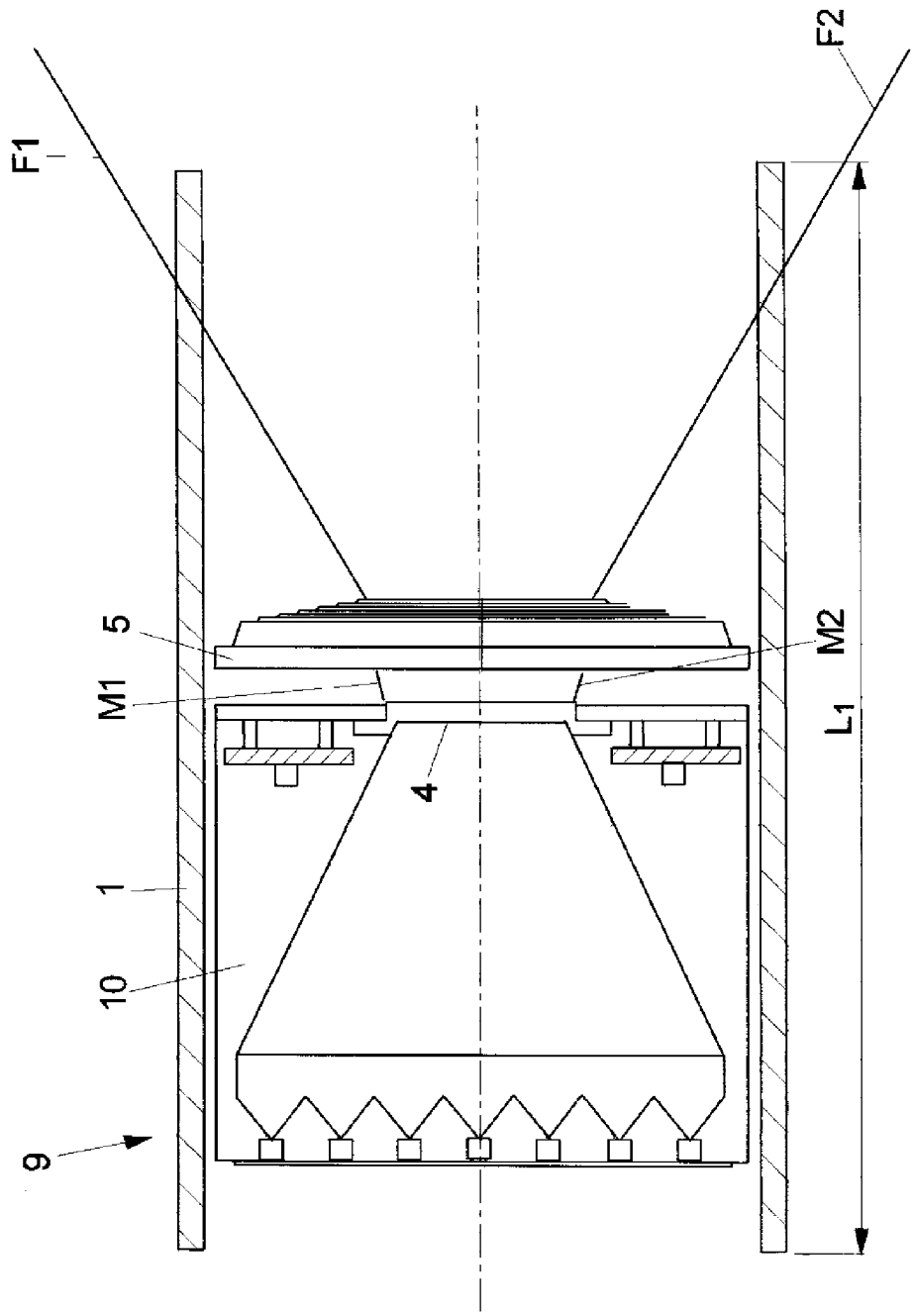

In case of a flood adjustment of the headlight illustrated in FIG. 34, in which the field optics 5 is moved within the lens barrel 1 with the length L1 close to the mixing optics 4, the beam path is disturbed since in case of an unchanged length L1 of the lens barrel 1 the outer light beams F1 and F2 given off by the field optics 5 strike the lens barrel 1 such that the light distribution is cut off and does not have a full outlet.

Figure 35:
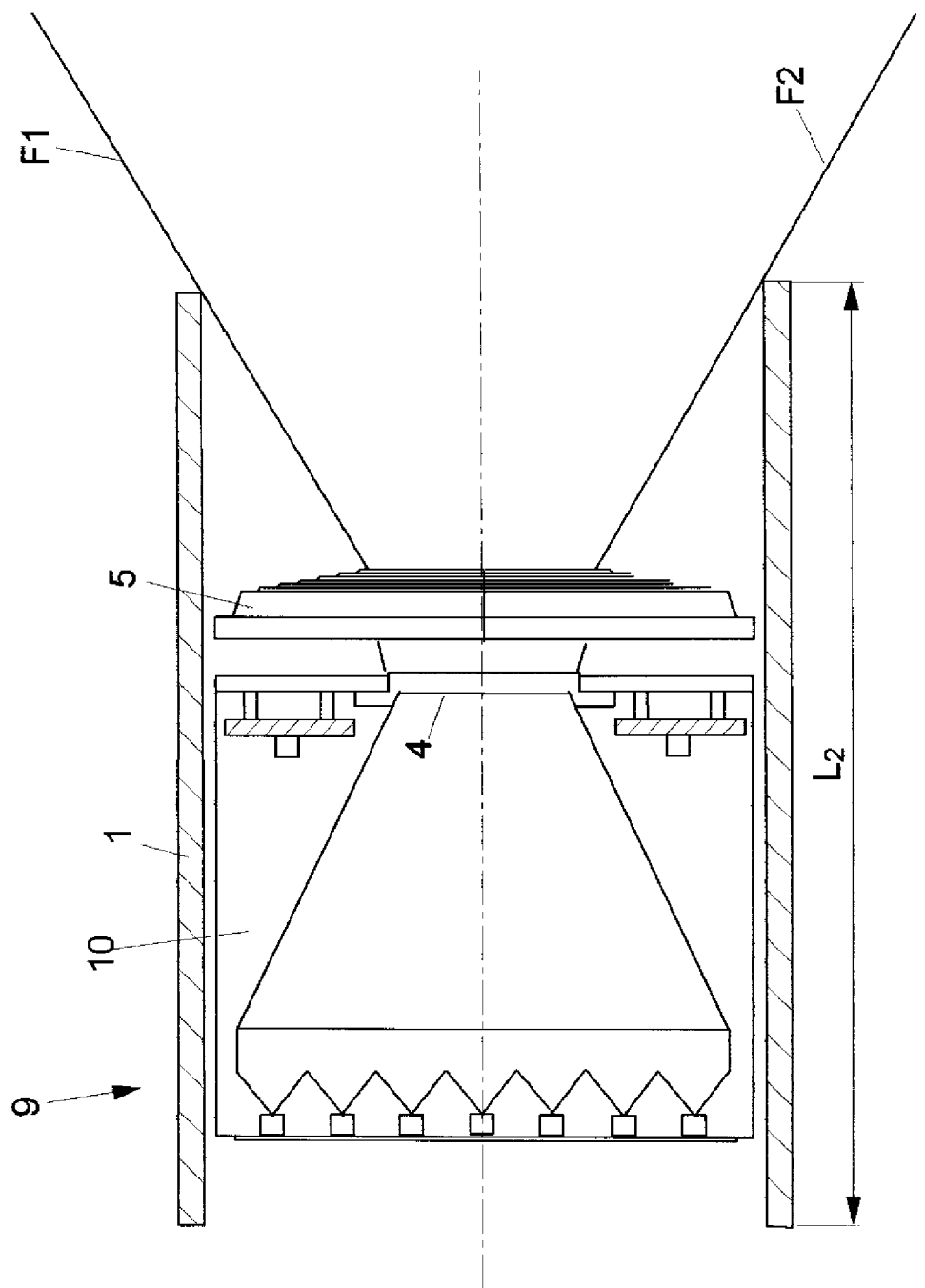

By reducing the lens barrel 1 according to FIG. 35 to the length L2 or alternatively by enlarging the diameter D of the lens barrel 1 an undisturbed beam path with the edge beams F1 and F2 and the flood adjustment of the LED headlight, in which the field optics 5 is arranged closely to the mixing optics 4 is again guaranteed.

Figure 36:
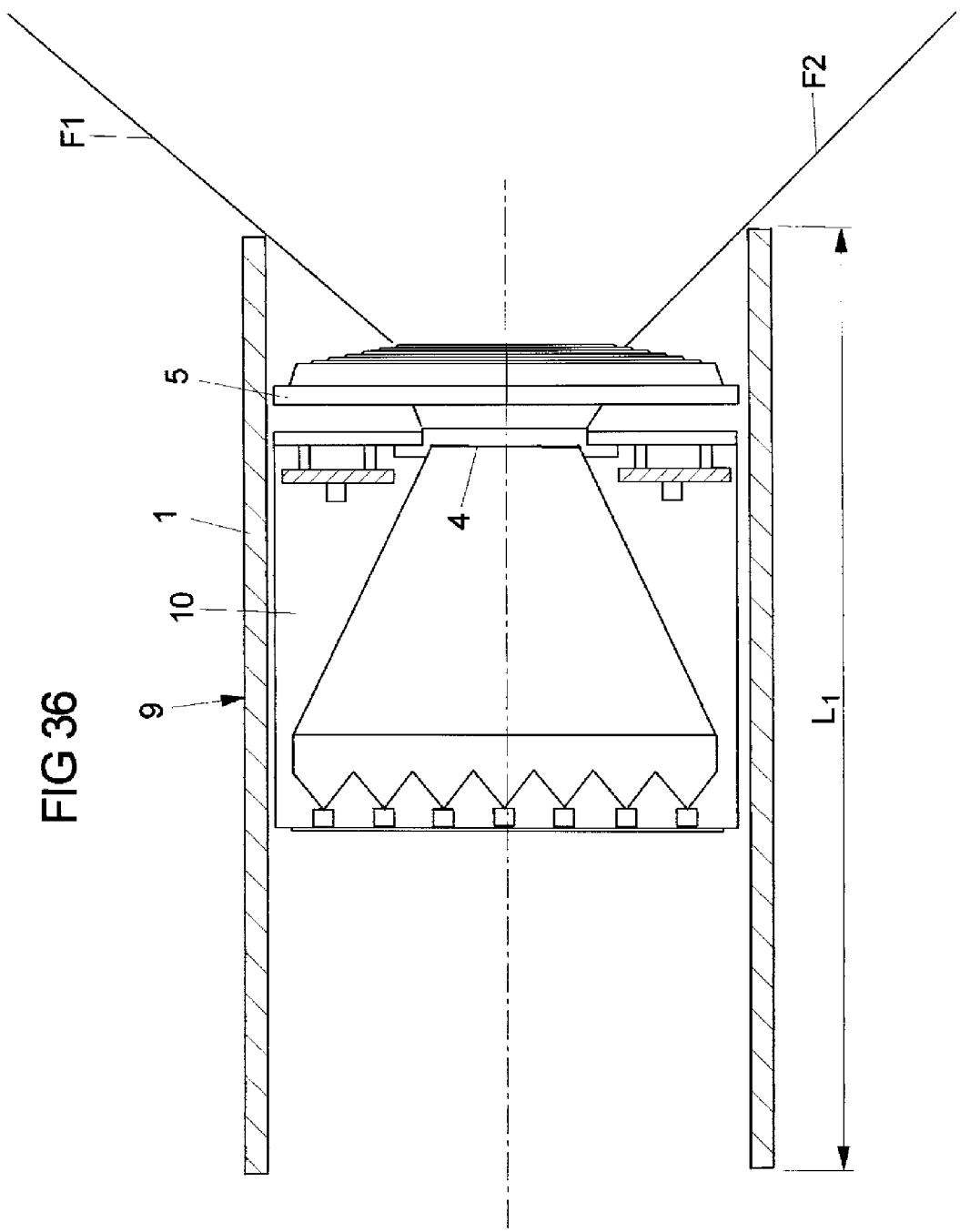

Alternatively the light generating unit 9 can provide according to FIG. 36 by displacing the cartridge 10 within the lens barrel 1, the length L1 thereof being unchanged in respect to the embodiments of the FIGS. 32 to 34, a flood adjustment with undisturbed beam of the edge beams F1 and F2 without changing the length or diameter of lens barrel 1.

FIG. 37 shows an asymmetrical view of an LED headlight with a headlight housing 8 with two parallel side surfaces 81, a partly cylindrically shaped upper side 83 and a partly cylindrically shaped lower side 82. The cylindrically shaped lens barrel 1 is arranged within the headlight housing 8, which projects in light emission direction of the LED headlight as light exit body from the front side 84 of the headlight housing 8.

Pivot joints 15 are mounted on the side surfaces 81 of the headlight housing 8, which are connected to the arms of retaining bracket for team for suspension of the LED headlight. The pivot joints 15 can alternatively be connected to a tripod in case of a standing arrangement of the LED headlight. Receptacles 19 for headlight equipment such as lens plates displaceable against each other, a leaf barn door, a grid, a diffuser, scrims, gobos, holographic scattering sheets or such are arranged on the outer surface of the lens barrel 1 and are distributed along the circumference, while a field lens 5 is inserted into the lens barrel 1.

In lens barrel 1 a cylindrically shaped cartridge 10 containing the light generating unit 9 and a light shaping device in form of a field lens 5 are arranged, which are relatively movable against each other, that means in case of a stationary field lens 5 the cartridge 10 is movable in longitudinal direction of lens barrel 1 or in case of a stationary cartridge 10 the field lens 5 is movably arranged in longitudinal direction in lens barrel 1. A hemisphere shaped body 12 with multiple distributed arranged cooling ribs is adjacent to the back side of the cartridge 10 of the light generating unit 9, which forms a thermal interface and faces away from the light emitting direction of the LED headlight.

In a modification the headlight housing 8, the field lens 5 and the receptacles 19 for the headlight equipment form a stationary unit, while the cartridge 10 with the light generating unit 9 can be adjusted for changing the reflecting angle of the LED headlight within the lens barrel 1 along the optical axis HA between a flood position for emitting the light with a large scattering angle and hard shadow formation, in which the light generating unit 9 is located close to the light exit opening of the LED headlight with the field lens 5, and a spot position for emitting light with a small scattering angle and soft shadow formation in a position removed from the light exit opening, that means the field lens 5.

FIG. 38 shows in a side view the LED headlight according to FIG. 1 in the flood position of the light generating unit 9, wherein the cartridge 10 of the light generating unit 3 is almost completely inserted into the lens barrel 1.

FIG. 39 shows the light generating unit 9 in a spot position, wherein the cartridge 10 of the light generating unit 9 is almost completely pulled out from the lens barrel 1 such that the light generating unit 9 is in a position removed from the light exit opening of the LED headlight and thus of the field lens 5.

LIST OF REFERENCE SIGNS

1 Lens barrel
2 Active light source (light engine)
3 Collimation optics
4 Mixing optics (condenser)
5 Field optics (Fresnel lens)
6 Optical elements
7 Control electronics
8 Headlight housing
9 Light generating unit
10 Cartridge
11 Truncated cone-shaped reflector
12 Thermal interface (cooling body)
13 Optical interface
14 Retaining bracket
15 Pivot joint
16 Spacer
18 Control and power supply cable
19 Receptical for headlight equipment
20 Plane area (board)
21-26 LEDs
27 Thermal sensor (NTC resistor)
30 Stepped lens structure (Fresnel structure)
31-36 Collimation optics
37 Cone-shaped total reflection lenses
40 Optical area
41 Mounting edge
51 Light entry side of the Fresnel lens (spiral-shaped honeycomb structure)
52 Light exit side of the Fresnel lens (Fresnel structure)
53, 53' Pentagonal optical elements
60 Diffuser disc or diffuser body
61 Completely translucent diffuser
62 Mirrored cone
70 Power supply or control cable
71 Electronic interface
72 Control electronic board 73 Studs
81 Side surfaces of the headlight housing
82 Partly cylinder-shaped lower side of the headlight housing
83 Partly cylinder-shaped upper side of the headlight housing
84 Front side of the headlight housing
91 Plane mirror
92 Concave curved mirror
93 Convex curved mirror
94 Combined reflector
101 Cylinder mantle
102 Circular disc-shaped front face
103 ring flange
104 Opening
105 Mounting edge
106 Sealed opening
110 Mantle surface
111 Base area
112 Deck area
113 Reflector section mirror inside
181 Light source interface
182 Control electronics interface
200 Curved area
A Emission direction
E Light beams on the entry side of the mixing optics
F1-F4 Edge light beams on the exit side of the field optics
HA Optical main axis
L1-L4 LED light beams
M1, M2 Edge light beams on the exit side of the mixing optics
N1, N2 Edge light beams on the exit side of the optical elements

The invention claimed is:

1. An LED luminaire, in particular an LED headlight, comprising an active light source of multiple LEDs having the same or different colour, said LEDs being arranged on a flat or curved surface or a board, and further comprising an optical system having
a collimation optics, individual lenses thereof being arranged next to emission surfaces of the LEDs, the collimation optics collects, focusses and directs light emitted by the LEDs onto a distant plane,
a condenser receiving this directed light, and mixing it in terms of colour or brightness,
a Fresnel lens being adjustable along an optical axis of the LED luminaire said adjustable Fresnel lens receiving the light emitted by said condenser and emitting said light with a pre-determined light distribution into a far field, wherein the light distribution may be a flood light distribution or a spot light distribution selected by adjusting a distance between the adjustable Fresnel lens and the condenser,
said collimation optics comprising on its light entry side cone shaped total reflection lenses, are each arranged directly in front of an LED and are directed thereto, said collimation optics comprising on its light exit side a stepped lens structure according to the type of a Fresnel lens, and
said collimation optics directing the light of the LEDs in such a way that it completely fills a light entry area of the condenser.

2. An LED luminaire, in particular an LED headlight, comprising an active light source of multiple LEDs having the same or different colour, said LEDs being arranged on a flat or curved surface or a board, and further comprising an optical system having
a collimation optics, individual lenses thereof being arranged next to emission surfaces of the LEDs, the collimation optics collects, focusses and directs light emitted by the LEDs onto a distant plane,
a condenser receiving this directed light, and mixing it in terms of colour or brightness,
a Fresnel lens being adjustable along an optical axis of the LED luminaire said adjustable Fresnel lens receiving the light emitted by said condenser and emitting said light with a pre-determined light distribution into a far field, wherein the light distribution may be a flood light distribution or a spot light distribution selected by adjusting a distance between the adjustable Fresnel lens and the condenser,
said collimation optics consisting of a plurality of optical elements which direct the light of the LEDs either in their original emission direction or in a different direction,
said collimation optics being either reflecting collimation optics or linear emitting collimation optics,
said LEDs with said collimation optics being arranged surrounding the condenser in a plane of the condenser,
said light emitted by the collimation optics being directed to a reflector, which reflects the light back to said condenser,
said condenser emitting the mixed light against the emission direction of said LEDs.

3. The LED luminaire of claim 2, wherein said reflector consists of a concavely curved or cone-like and facetted mirror distanced from said flat or curved surface or board.

4. The LED luminaire of claim 2, wherein said collimation optics collimates the light and emits the light as a linear light source, the light emitted by said collimation optics being directed to said reflector.

5. The LED luminaire of claim 2, wherein said reflector is concave curved or cone-like or facetted and wherein said LEDs and said collimation optics being arranged in a ring, multiple rings or a polygonal outer cover around the optical axis of the LED luminaire.

6. The LED luminaire of claim 2, wherein said LEDs and said collimation optics are arranged in a ring, multiple rings or a polygonal outer cover around the optical axis of the LED luminaire on said flat or curved surface or board, which is in the plane of a mixing optic and receives or surrounds a mixing optic in a central area, and wherein said reflector is a plane reflector when using reflecting collimation optics or a concave reflector when using linear emitting collimation optics.

7. The LED luminaire of claim 1 or 2, wherein said collimation optics is designed as an optic board, into which optical surfaces with different emission directions are included.

8. The LED luminaire of claim 1 or 2, comprising mixing optics emitting light which is then incident on said condenser, which condenser then emits a light and does not significantly change the direction of the light being incident on said condenser and mixes the light emitted in an emission direction by the collimation optics and is thus effective as a secondary light source at the light exit side.

9. The LED luminaire of claim 8, wherein said condenser comprises a structure consisting of honeycombs, prisms or micro lenses on the light entry side or the light exit side.

10. The LED luminaire of claim 1 or 2, wherein further optical elements are arranged between said active light source and said condenser, said optical elements being designed as lenses, lens systems or reflectors, which deflect or reshape the light such that it is emitted to said condenser in a pre-determined manner.

11. The LED luminaire of claim 1 or 2, wherein said adjustable Fresnel lens incorporates a scattering structure.

12. The LED luminaire of claim 1 or 2, wherein further optical elements are arranged between said condenser and said adjustable Fresnel lens, said optical elements being designed as lenses, lens systems or reflectors for reflecting or reshaping the light such that a pre-determined light distribution is formed in the far field.

13. The LED luminaire of claim 2, wherein said reflector is a truncated cone-like reflector, a mantle area thereof is mirrored inside, an open base area thereof is adjacent to said collimation optics and an open deck area thereof receives said condenser or is adjacent to said condenser.

14. The LED luminaire of claim 1 or 2, wherein said flat or curved surface or board comprising multiple distributed thermal sensors, which record a temperature on the said flat or curved surface or board in different temperature zones.

15. The LED luminaire of claim 1 or 2, wherein a device comprising at least one of a photo diode, a colour sensor and a mini spectrometer is arranged in a beam path of the light emitted by the LEDs, and an exit signal of the device is delivered as an entry signal to a control electronics which regulates the brightness colour of the light emitted by the LEDs as pre-determined values.

16. The LED luminaire of claim 1 or 2, wherein said adjustable Fresnel lens is adjustable in a lens barrel in a direction of the optical axis of the LED luminaire.

17. The LED luminaire of claim 1 or 2, wherein at least a part of the light emitted by the LEDs is directed through a colour filter, such that a spectrum of the light emitted by the headlight is changed in a pre-determined manner, whereby the combination of a spectral emitting characteristic of the LEDs and a spectral transmission of the colour filter optimizes the light emitted from the headlight in colour such that at least one of a desired colour location and a desired colour reproduction at maximum brightness is achieved at maximum brightness.

18. An optical system according to claim 1 or 2, wherein said active light source comprises multiple LEDs arranged on an inner side of the curved surface consisting of a part or half bowl, a hollow parable or an aspheric hollow surface, wherein said LEDs emit light to the centre of curvature or focus of the curved surface, and wherein the same collimation optics is provided for multiple or all LEDs of the active light source.

19. The LED luminaire of claim 1 or 2, wherein said LEDS with said collimation optics and said condenser are enclosed in a cartridge in a shape of a hollow cylinder or cone, wherein said LEDs and said collimation optics are located on a bottom of said cartridge and said condenser is located in a cut-out of an opposite side of said cartridge.

20. The LED luminaire of claim 19, wherein a barrel or tube is mounted in parallel to an axis of said cartridge and surrounding it, and wherein said barrel or tube contains said adjustable Fresnel lens on one front side thereof, said adjustable Fresnel lens being movable along a direction parallel to the axis of the cartridge, thereby adjusting the light output of the LED luminaire between a "spotlight" beam and a "flood light" beam.

21. LED luminaire, in particular an LED headlight, comprising an active light source of multiple LEDs having the same or different colour, said LEDs being arranged on a flat or curved surface or a board, and further comprising an optical system having
    a collimation optics, individual lenses thereof being arranged next to emission surfaces of the LEDs, the collimation optics collects, focusses and directs light emitted by the LEDs onto a light incident surface of mixing optics,
    the mixing optics receiving the light directed onto the surface and focussed, and mixing said light in terms of at least one of a colour and a brightness,
    a field optics receiving the light emitted by said mixing optics and emitting said light with a pre-determined light distribution into the far field,
    said collimation optics comprising on its light entry side cone shaped total reflexion lenses, which are each arranged directly in front of an LED and are directed thereto,
said collimation optics comprising on its light exit side a Fresnel lens, and
    said collimation optics reflecting the light emitted by the LEDs such that they essentially fill a light entry area of the mixing optics with light, wherein said mixing optics is arranged in the opening of a ring flange, an outer diameter thereof being equal to an outer diameter of said flat or curved surface or board or a circular disc-like plate connected to said flat or curved surface or board, wherein said ring flange and said flat or curved surface or board or said circular disc-like plate form the front faces of a hollow cylindrical cartridge, a cylindrical mantle thereof being connected to said ring flange and to said flat or curved surface or board or the circular disc-like plate, said cartridge and said Fresnel lens being arranged in a lens barrel of the luminaire housing, said Fresnel lens and said lens barrel being adjustable along an optical axis of the LED luminaire thereby moving with respect to the cartridge, or the cartridge can be adjusted along the optical axis of the LED luminaire thereby moving with respect to the Fresnel lens and lens barrel.

22. An LED luminaire, in particular an LED headlight, comprising an active light source of multiple LEDs having the same or different colour, said LEDs being arranged on a flat or curved surface or a board, and further comprising an optical system having,
    a collimation optics, individual lenses thereof being arranged next to emission surfaces of the LEDs, the collimation optics collects, focusses and directs light emitted by the LEDs onto a light mixing surface of mixing optics, wherein said
    the mixing optics receive the light directed onto the light mixing surface and mix said light in terms of at least one of a colour and a brightness,
    a field optics receiving the light emitted by said mixing optics and emitting said light with a pre-determined light distribution into a far field,
    said collimation optics comprising discrete collimation elements with different emission directions or
    said collimation optics comprising multiple optical elements, which focus the light emitted by the LEDs arranged on the flat or curved surface or board, the light being focused away from the LEDs,
    said LEDs and said collimation elements or optical elements being arranged on said flat or curved surface or board which is in the plane of the mixing optics and receives or surrounds said mixing optics in a central area,
    said light emitted by the collimation elements or optical elements being directed to a reflector, which reflects the light to the mixing optics,
    said mixing optics emitting the mixed light against an emission direction of said LEDs, wherein said mixing optics is arranged in an opening of a ring flange, an outer diameter thereof equals an outer diameter of said flat or curved surface or board or a circular disc-like plate connected to said flat or curved surface or board, wherein said ring flange and said flat or curved surface or board or said circular disc-like plate form front faces of a hollow cylindrical cartridge, a cylindrical mantle thereof is connected to said ring flange and to said flat or curved surface or board or the circular disc-like plate, said cartridge and a Fresnel lens being arranged in a lens barrel of the luminaire or a headlight housing, said Fresnel lens and said lens barrel being adjustable along an optical axis of the LED luminaire thereby moving with respect to the cartridge, or the cartridge can be adjusted along the optical axis of the LED luminaire thereby moving with respect to the Fresnel lens and lens barrel.

* * * * *